(12) United States Patent
Heinemeyer et al.

(10) Patent No.: US 12,034,767 B2
(45) Date of Patent: Jul. 9, 2024

(54) ARTIFICIAL INTELLIGENCE ADVERSARY RED TEAM

(71) Applicant: Darktrace Holdings Limited, Cambridge (GB)

(72) Inventors: Maximilian Florian Thomas Heinemeyer, Cambridge (GB); Stephen James Pickman, Huntingdon (GB); Carl Joseph Salji, Bedford (GB)

(73) Assignee: Darktrace Holdings Limited, Cambridge (GB)

( * ) Notice: Subject to any disclaimer, the term of this patent is extended or adjusted under 35 U.S.C. 154(b) by 507 days.

(21) Appl. No.: 17/187,373

(22) Filed: Feb. 26, 2021

(65) Prior Publication Data

US 2021/0194924 A1    Jun. 24, 2021

Related U.S. Application Data

(63) Continuation-in-part of application No. 17/004,392, filed on Aug. 27, 2020, now Pat. No. 11,709,944.

(Continued)

(51) Int. Cl.
*H04L 9/40* (2022.01)
*G06N 5/04* (2023.01)
*G06N 20/00* (2019.01)

(52) U.S. Cl.
CPC .......... *H04L 63/1483* (2013.01); *G06N 5/04* (2013.01); *G06N 20/00* (2019.01)

(58) Field of Classification Search
None
See application file for complete search history.

(56) References Cited

U.S. PATENT DOCUMENTS 6,154,844 A   11/2000  Touboul et al.
6,965,968 B1  11/2005  Touboul
(Continued)

FOREIGN PATENT DOCUMENTS

EP    2922268 A1      9/2015
WO    2001031420 A2   5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Amare F Tabor
*Assistant Examiner* — Mahabub S Ahmed
(74) *Attorney, Agent, or Firm* — Rutan and Tucker LLP

(57) ABSTRACT

An AI adversary red team configured to pentest email and/or network defenses implemented by a cyber threat defense system used to protect an organization and all its entities. AI model(s) trained with machine learning on contextual knowledge of the organization and configured to identify data points from the contextual knowledge including language-based data, email/network connectivity and behavior pattern data, and historic knowledgebase data. The trained AI models cooperate with an AI classifier in producing specific organization-based classifiers for the AI classifier. A phishing email generator generates automated phishing emails to pentest the defense systems, where the phishing email generator cooperates with the AI models to customize the automated phishing emails based on the identified data points of the organization and its entities. The customized phishing emails are then used to initiate one or more specific (Continued)

attacks on one or more specific users associated with the organization and its entities.

18 Claims, 7 Drawing Sheets

Related U.S. Application Data

(60) Provisional application No. 62/983,307, filed on Feb. 28, 2020, provisional application No. 62/893,350, filed on Aug. 29, 2019.

(56) References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 7,890,869 | B1 | 2/2011 | Mayer et al. |
| 8,312,540 | B1 | 11/2012 | Kahn et al. |
| 8,407,798 | B1* | 3/2013 | Lotem .............. G06F 21/55 726/21 |
| 8,621,614 | B2* | 12/2013 | Vaithilingam ...... H04L 63/0245 713/188 |
| 8,661,538 | B2 | 2/2014 | Cohen-Ganor et al. |
| 8,819,803 | B1 | 8/2014 | Richards et al. |
| 8,879,803 | B2 | 11/2014 | Ukil et al. |
| 8,881,288 | B1* | 11/2014 | Levy ................ G06F 21/577 709/225 |
| 8,966,036 | B1 | 2/2015 | Asgekar et al. |
| 9,043,905 | B1 | 5/2015 | Allen et al. |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,292,695 | B1* | 3/2016 | Bassett ............. G06F 21/577 |
| 9,348,742 | B1 | 5/2016 | Brezinski |
| 9,369,484 | B1* | 6/2016 | Lacerte ............ H04L 63/1416 |
| 9,401,925 | B1 | 7/2016 | Guo et al. |
| 9,516,039 | B1 | 12/2016 | Yen et al. |
| 9,516,053 | B1 | 12/2016 | Muddu et al. |
| 9,641,544 | B1 | 5/2017 | Treat et al. |
| 9,712,548 | B2 | 7/2017 | Shmuell et al. |
| 9,727,723 | B1 | 8/2017 | Kondaveeti et al. |
| 9,742,803 | B1* | 8/2017 | Kras ................ G06F 21/577 |
| 10,237,298 | B1 | 3/2019 | Nguyen et al. |
| 10,268,821 | B2 | 4/2019 | Stockdale et al. |
| 10,320,813 | B1* | 6/2019 | Ahmed ............ H04L 63/1416 |
| 10,382,473 | B1* | 8/2019 | Ashkenazy ....... H04L 63/1466 |
| 10,419,466 | B2 | 9/2019 | Ferguson et al. |
| 10,516,693 | B2 | 12/2019 | Stockdale et al. |
| 10,601,865 | B1* | 3/2020 | Mesdaq ........... H04L 63/1425 |
| 10,659,335 | B1* | 5/2020 | Morris ............. H04L 43/50 |
| 10,701,093 | B2 | 6/2020 | Dean et al. |
| 10,754,959 | B1* | 8/2020 | Rajasooriya ........ G06N 7/01 |
| 10,848,515 | B1* | 11/2020 | Pokhrel ............ H04L 63/1433 |
| 11,228,612 | B2* | 1/2022 | Vajipayajula ...... H04L 63/1466 |
| 11,310,268 | B2* | 4/2022 | Bowditch ............ G06N 20/00 |
| 2002/0174217 | A1 | 11/2002 | Anderson et al. |
| 2002/0186698 | A1 | 12/2002 | Ceniza |
| 2003/0070003 | A1 | 4/2003 | Chong et al. |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2006/0021044 | A1* | 1/2006 | Cook ............... H04L 63/1433 726/25 |
| 2006/0021046 | A1* | 1/2006 | Cook ................ G06F 21/577 726/25 |
| 2006/0021047 | A1* | 1/2006 | Cook ............... H04L 63/1433 726/25 |
| 2006/0021048 | A1* | 1/2006 | Cook ............... H04L 63/1433 726/25 |
| 2006/0021050 | A1* | 1/2006 | Cook ............... H04L 63/1433 726/25 |
| 2007/0118909 | A1 | 5/2007 | Hertzog et al. |
| 2007/0192855 | A1* | 8/2007 | Hulten .............. H04L 63/1483 707/E17.115 |
| 2007/0294187 | A1 | 12/2007 | Scherrer |
| 2008/0005137 | A1 | 1/2008 | Surendran et al. |
| 2008/0077358 | A1 | 3/2008 | Marvasti |
| 2008/0109730 | A1 | 5/2008 | Coffman et al. |
| 2008/0167920 | A1* | 7/2008 | Schmidt ............ G06Q 90/00 705/7.42 |
| 2009/0106174 | A1 | 4/2009 | Battisha et al. |
| 2009/0254971 | A1 | 10/2009 | Herz et al. |
| 2010/0009357 | A1 | 1/2010 | Nevins et al. |
| 2010/0058456 | A1* | 3/2010 | Jajodia ............. G06F 21/552 726/11 |
| 2010/0095374 | A1 | 4/2010 | Gillum et al. |
| 2010/0107254 | A1 | 4/2010 | Elland et al. |
| 2010/0125908 | A1 | 5/2010 | Kudo |
| 2010/0235908 | A1 | 9/2010 | Eynon et al. |
| 2010/0299292 | A1 | 11/2010 | Collazo |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0284791 | A1 | 11/2012 | Miller et al. |
| 2012/0304288 | A1 | 11/2012 | Wright et al. |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0198846 | A1* | 8/2013 | Chapman ........ G06Q 10/0635 726/25 |
| 2013/0254885 | A1 | 9/2013 | Devost |
| 2013/0318616 | A1* | 11/2013 | Christodorescu ..... G06F 21/552 726/25 |
| 2014/0007237 | A1 | 1/2014 | Wright et al. |
| 2014/0074762 | A1 | 3/2014 | Campbell |
| 2014/0165207 | A1 | 6/2014 | Engel et al. |
| 2014/0215618 | A1 | 7/2014 | Amit |
| 2014/0325643 | A1 | 10/2014 | Bart et al. |
| 2015/0058993 | A1* | 2/2015 | Choi .............. H04L 63/1433 726/25 |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0286819 | A1 | 10/2015 | Coden et al. |
| 2015/0287336 | A1* | 10/2015 | Scheeres ............ G09B 5/02 434/156 |
| 2015/0310195 | A1 | 10/2015 | Bailor et al. |
| 2015/0319185 | A1 | 11/2015 | Kirti et al. |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2015/0381649 | A1* | 12/2015 | Schultz ........... G06Q 10/0635 726/25 |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0205122 | A1* | 7/2016 | Bassett ............. H04L 63/1441 726/23 |
| 2016/0241576 | A1 | 8/2016 | Rathod et al. |
| 2016/0330238 | A1* | 11/2016 | Hadnagy .......... H04L 63/1483 |
| 2016/0352768 | A1 | 12/2016 | Lefebvre et al. |
| 2016/0359695 | A1 | 12/2016 | Yadav et al. |
| 2016/0373476 | A1 | 12/2016 | Dell'Anno et al. |
| 2017/0026388 | A1* | 1/2017 | Gatti .............. H04L 51/212 |
| 2017/0046519 | A1* | 2/2017 | Cam .............. G06N 7/01 |
| 2017/0048266 | A1* | 2/2017 | Hovor ............. H04L 63/1433 |
| 2017/0054745 | A1 | 2/2017 | Zhang et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |

(56) References Cited

U.S. PATENT DOCUMENTS

| | | | |
|---|---|---|---|
| 2017/0169360 | A1 | 6/2017 | Veeramachaneni et al. |
| 2017/0214701 | A1* | 7/2017 | Hasan ................. H04L 63/1491 |
| 2017/0270422 | A1 | 9/2017 | Sorakado |
| 2018/0027006 | A1 | 1/2018 | Zimmermann et al. |
| 2018/0041537 | A1* | 2/2018 | Bloxham ............ H04L 63/0263 |
| 2018/0124108 | A1* | 5/2018 | Irimie ....................... G06N 5/02 |
| 2018/0167402 | A1 | 6/2018 | Scheidler et al. |
| 2018/0219901 | A1* | 8/2018 | Gorodissky .......... H04L 63/1433 |
| 2018/0295154 | A1* | 10/2018 | Crabtree ............. H04L 63/1433 |
| 2018/0359272 | A1* | 12/2018 | Mizrachi ............... H04L 67/535 |
| 2018/0367549 | A1* | 12/2018 | Jang ........................ G06N 5/022 |
| 2019/0014141 | A1* | 1/2019 | Segal .................. H04L 63/1483 |
| 2019/0014149 | A1* | 1/2019 | Cleveland .............. G06N 3/045 |
| 2019/0036948 | A1 | 1/2019 | Appel et al. |
| 2019/0044963 | A1 | 2/2019 | Rajasekharan et al. |
| 2019/0114245 | A1* | 4/2019 | Mermoud ........... G06F 11/3466 |
| 2019/0171984 | A1* | 6/2019 | Irimie ................ G06Q 10/0635 |
| 2019/0173917 | A1* | 6/2019 | Sites ....................... G06N 3/082 |
| 2019/0173918 | A1* | 6/2019 | Sites ....................... G06N 3/044 |
| 2019/0173919 | A1* | 6/2019 | Irimie ................. H04L 63/1483 |
| 2019/0182266 | A1* | 6/2019 | Doron ................... H04L 63/145 |
| 2019/0238571 | A1* | 8/2019 | Adir .................... H04L 63/1425 |
| 2019/0245883 | A1* | 8/2019 | Gorodissky ......... H04L 63/1433 |
| 2019/0251260 | A1 | 8/2019 | Stockdale et al. |
| 2019/0260783 | A1* | 8/2019 | Humphrey ............ H04L 63/101 |
| 2019/0297096 | A1* | 9/2019 | Ahmed ............... H04L 63/1441 |
| 2019/0342307 | A1* | 11/2019 | Gamble .............. G06F 16/9024 |
| 2019/0347578 | A1* | 11/2019 | Bolding .............. H04L 63/1433 |
| 2019/0349400 | A1* | 11/2019 | Bruss .................... G06F 21/568 |
| 2020/0034752 | A1* | 1/2020 | Luo ...................... G06Q 10/107 |
| 2020/0177615 | A1* | 6/2020 | Grabois ................. H04L 63/20 |
| 2020/0177617 | A1* | 6/2020 | Hadar ................. G06F 16/9024 |
| 2020/0177618 | A1* | 6/2020 | Hassanzadeh ........ G06F 21/552 |
| 2020/0244673 | A1 | 7/2020 | Stockdale |
| 2020/0267183 | A1* | 8/2020 | Vishwanath ........ H04L 63/1483 |
| 2020/0280575 | A1 | 9/2020 | Dean et al. |
| 2020/0358798 | A1* | 11/2020 | Maylor ............... H04L 63/1433 |
| 2020/0379079 | A1* | 12/2020 | Dupray ................. H04W 64/00 |
| 2021/0012012 | A1* | 1/2021 | Soroush ............... H04L 63/205 |
| 2021/0014256 | A1* | 1/2021 | Malhotra ............ H04L 63/1425 |
| 2021/0021629 | A1* | 1/2021 | Dani .................... H04L 63/1433 |
| 2021/0029154 | A1* | 1/2021 | Picard .................... H04L 51/18 |
| 2021/0029164 | A1* | 1/2021 | Albero ................... H04L 63/20 |
| 2021/0092153 | A1* | 3/2021 | Wei ........................ H04L 45/64 |
| 2021/0120027 | A1 | 4/2021 | Dean et al. |
| 2021/0157919 | A1 | 5/2021 | Stockdale et al. |
| 2021/0273958 | A1 | 9/2021 | McLean |
| 2021/0281596 | A1* | 9/2021 | Covell ................ H04L 63/1483 |
| 2021/0367962 | A1* | 11/2021 | Kurowski ............. G06F 21/577 |
| 2021/0409449 | A1* | 12/2021 | Crabtree ............ H04L 63/1441 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |
| WO | 2019243579 A1 | 12/2019 |
| WO | 2020021100 A1 | 1/2020 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany. International Search Authority, International Search Report and Written Opinion, 12pages.

John Seymour et al: "Generative Models for Spear Phishing Posts on Social Media", Arxiv.Org, Cornell University Library, 201 Olin Library Cornell University Ithaca, NY 14853, Feb. 14, 2018 (Feb. 14, 2018), XP081222023.

Marwan El-Gendi, "Red teaming 101: an introduction to red teaming and how it improves your cyber security," PwC United Kingdom, 8 pages.

NIST Computer Security Resource Center, "Red Team—Glossary", 2 pages.

Gharan, Shayan Oveis, "Lecture 11: Clustering and the Spectral Partitioning Algorithm" May 2, 2016, 6 pages.

Nikolystylfw, "Can Senseon beat Darktrace at its very own game with its 'An I triangulation' modern technology?" Dec. 22, 2018, nikolystylfw.

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019" Jun. 3, 2019, 16 pages.

Caithness, Neil, "Supervised/unsupervised cross-over method for autonomous anomaly classification," Oct. 25, 2019, CAMLIS 2019.

Senseon Tech Ltd., "Technology," * please see the statement filed herewith.

Senseon Tech Ltd., "Senseon & You," * please see the statement filed herewith.

Senseon Tech Ltd., "Technology Overview," * please see the statement filed herewith.

Senseon Tech Ltd., "Senseon Enterprise," * please see the statement filed herewith.

Senseon Tech Ltd., "Senseon Pro," * please see the statement filed herewith.

11 Senseon Tech Ltd., "Senseon Reflex," * please see the statement filed herewith.

* cited by examiner

ARTIFICIAL INTELLIGENCE ADVERSARY RED TEAM

RELATED APPLICATION

This continuation-in-part application claims priority to and the benefit of under 35 CFR 121 of U.S. non-provisional patent application "AN INTELLIGENT ADVERSARY SIMULATOR," filed Aug. 27, 2020, application Ser. No. 17/004,392, which claims priority to and the benefit of under 35 CFR 119 of U.S. provisional patent application titled "ARTIFICIAL INTELLIGENCE BASED CYBER SECURITY SYSTEM," filed Aug. 29, 2019, application No. 62/893,350, as well as also claims priority to and the benefit of under 35 CFR 119 of U.S. provisional patent application titled "An Artificial Intelligence Based Cyber Security System," filed Feb. 28, 2020, application No. 62/983,307, which are incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber security detection system. In several embodiments, one or more artificial Intelligence (AI) processes may be implemented with an AI adversary red team to generate phishing emails to pentest defenses of an email defense system and/or a network defense system.

BACKGROUND

In a cyber security environment, firewalls, security and scanning methods, and other detection and defense tools may be deployed to enforce specific policies and scan for vulnerabilities in order to provide protection against certain threats on such environment. These tools currently form an important part of an organization's cyber defense strategy, but they are insufficient in the new age of cyber threat. For example, existing methods for vulnerability scanning processes are typically performed by humans are less targeted and may lead to security resource allocation in the wrong places and so on. Also, some vulnerability scanners and simulators actually test and compromise the actual network devices themselves, which may adversely affect the network and the organization during this testing and scanning.

Existing cyber threat protection systems also generally ingest connectivity data to detect cyber threats in a passive way to access simulations of how a cyber threat might impact an organization's defenses. For example, an organization may typically hire a human red team of cyber security professionals to test a defense system's vulnerability to cyber-attacks through various passive simulations. However, these human red team security professionals are usually very expensive to hire for most organizations. In addition, the human red team security professionals test the defense systems for one or more generalized vulnerabilities of the organization, without focusing on any specific defense systems, users, or attack simulations, nor offering any customizable attack simulations based on the specific organization and its specific users and entities. Accordingly, these existing tools such as the vulnerability scanners and simulators are failing to deal with new cyber threats because the traditional approach relies on being able to test and identify any vulnerabilities by gathering ingested data through various passive and generalized simulations.

The reality is that modern threats bypass these existing tools and protection systems on a daily basis. Such tools and protection systems need a new tool and protection system based on a new approach that may complement them and mitigate their deficiencies at scale across the entirety of digital organizations. In the complex modern world, it is advantageous that the approach is fully automated as it is virtually impossible for humans to sift through the vast amount of security information gathered each minute within a digital business and then to passively simulate vulnerabilities based on that information. In particular, a protection system that can particularly identify how vulnerable any of those identified simulations is needed. Such that the detection system may be used to identify any specific vulnerabilities in a proactive and customizable way that provides full awareness of vulnerabilities to that specific organization in light of its specific users and specific entities instead of the existing detection systems that are being used.

SUMMARY

In an embodiment, an artificial intelligence (AI) adversary red team may be configured to initiate a penetration test (herein, referred to as pentest) on one or more defenses of a cyber threat defense system. In particular, the AI adversary red team may be configured to pentest an email defense system as well as a network defense system, which are implemented by the cyber threat defense system to protect an organization (e.g., a company) and all its entities, devices, users, and so on.

In an embodiment, one or more AI models may be trained with machine learning on all the contextual knowledge pertaining to the organization and its entities, devices, users, and so on. The trained AI models may also be configured to identify various data points from the contextual knowledge of the organization. For example, the contextual knowledge may include, but is not limited to, language-based data, email and network connectivity and behavior pattern data, and/or historical knowledgebase data that has been observed (or collected, ingested, etc.) for that specific organization and all its specific entities, devices, users, etc. As such, the AI adversary red team simulator may use the trained AI models to cooperate with one or more AI classifiers in producing a list of specific organization-based classifiers for those AI classifiers.

In an embodiment, the AI adversary red team may include a phishing email generator configured to generate one or more automated phishing emails used to pentest any of the organization's entities, devices, and/or users in the email defense system as well as the network defense system. The AI adversary red team may use the phishing email generator in conjunction with the one or more trained AI models to customize the generated phishing emails based on any of the data from the identified data points. The customized phishing emails may then be used to at least initiate one or more specific attacks on one or more specific users (including any specific entities, devices, etc.) in the email defense system.

In some embodiments, the phishing email generator may further include a paraphrasing engine configured to receive email-based data from the one or more identified data points and then break up the received email-based data into two or more segments of an email. For example, the two or more segments may include, but are not limited to, a subject line, a body content, a signature line, and/or any other desired segments (or components, characteristics, etc.) of the email. In additional embodiments, the paraphrasing engine may also be configured to rephrase that received email-based data, such that one or more particular segments of a first phishing email are slightly different from one or more particular segments of a second phishing email from the customized phishing emails. For example, the AI adversary red team may implement this rephrasing process to ensure that the one or more segments of the customized phishing emails, such as the subject lines, the body content, and so on, are sufficiently different from each other to avoid sending the same contextual data in those segments to multiple recipient users when/if multiple customizable phishing emails are being generated.

In some embodiments, the AI adversary red team may include a payload module cooperating with the phishing email module to generate at least one or more of a first payload and/or a second payload that are attached to the customized phishing emails. The first payload may be configured as a non-executable payload, whereas the second payload may be configured as a executable payload. In an embodiment, a training module may also be configured to cooperate with the payload module to train the one or more specific users attacked in the organization that were spoofed and activated the first payload in the customized phishing emails.

In several embodiments, the AI adversary red team may include a simulated cyber-attack module configured to use the second payload to spoof the one or more specific users in both the email and network defense systems. The second payload may be used to identify one or more "actual" vulnerabilities in the respective defense systems when/if the second payload is successfully activated and executed in the respective devices, entities, and so on. The simulated cyber-attack module may be configured to cooperate with the trained AI models to customize the initiated specific attacks in light of one or more specific attack scenarios implemented for those specific users, devices, and/or entities that are compromised in the network defense system. In some embodiments, the AI adversary red team may also include a scenario module configured to generate the specific attack scenarios with the cooperation of the trained AI models and an orchestration module, where the generated specific attack scenarios may be particularly customized based on the email/network connectivity and behavior pattern data of those specific users/devices/entities in the email/network defense systems in conjunction with any specific data from the contextual knowledge of the specific organization.

These and other features of the design provided herein may be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1:
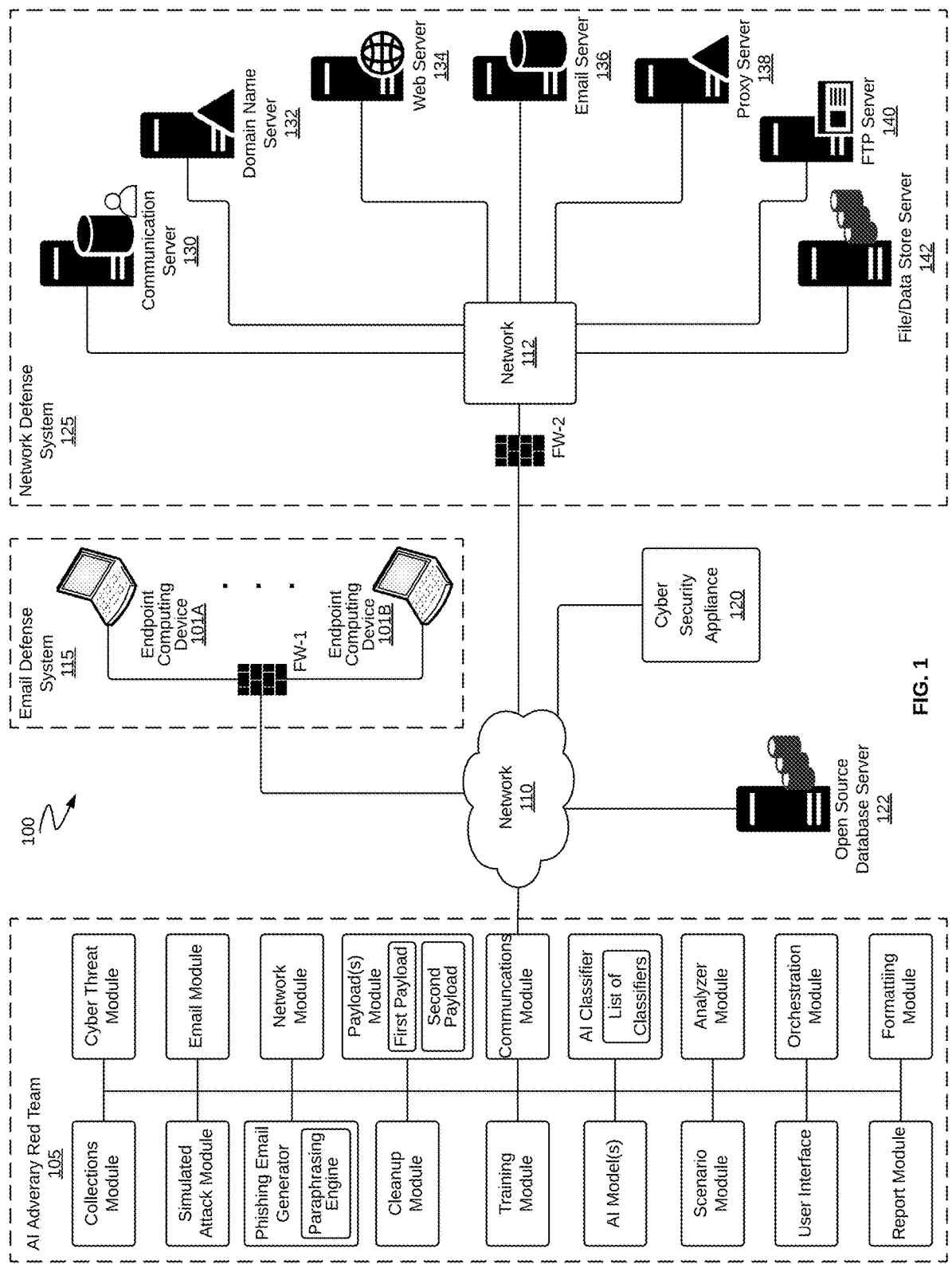
FIG. 1 illustrates a block diagram of an AI cyber threat security system having an AI adversary red team configured to cooperate with a cyber security appliance to pentest on one or more cyber defense systems, in accordance with an embodiment of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

In general, the embodiments described herein include an AI cyber-threat defense system having an AI adversary red team for generating one or more automated and customizable AI phishing emails to pentest one or more defenses implemented in an email network defense system, a network defense system, and/or any other similar defense systems, which are used to protect an organization such as a company, a client, etc., and all of the entities of the organization (e.g., such entities may be any email and network devices, endpoint devices, network servers and databased, network addresses, user agents, domain addresses, file directories, communication ports, analysts, end users, etc.). As used herein, an AI adversary red team may refer to at least one or more of an apparatus, an appliance, a simulator, an extension (or agent), a service, a module, etc., configured as an attacking module or the like that may combine one or more cooperating modules, engines, and so on, which may be implemented from both AI trained intrusion prevention and intrusion detection systems. For example, as used herein, the AI cyber-threat defense system may implement the AI adversary red team as an attack module as well as a training module depending on the desired goals of the respective organization (e.g., as shown with the AI adversary red team 105 in FIG. 1), while a cyber security appliance may be implemented as a cyber threat detection and protection module (e.g., as shown with the cyber security appliance 120 in FIG. 1).

In some embodiments, the AI adversary red team is configured to train and/or attack an organization such as a company, an enterprise network, etc. Whereas, in some embodiments, the cyber security appliance, as the detection module, may be configured to detect particular unusual email and network connectivity/activity and behavior patterns from the AI adversary red team. However, in several embodiments as described below, the AI adversary red team may be configured to cooperate with the cyber security appliance to obtain specific data about specific users, devices, and entities in specific (and generally secured) networks in specific defense systems of specific organizations. Based on those several embodiments, the AI adversary red team may use the obtained specific data to generate one or more specific phishing emails tailored to those specific users, devices, and/or entities of the specific organization. Meanwhile, in certain embodiments, the AI adversary red team and the cyber security appliance may compete against each other. These embodiments described above concerning the AI adversary red team and any other aspects, features, and improvements of such embodiments may be described below in further detail.

Referring now to FIG. 1, an AI cyber threat security system 100 having an AI adversary red team 105 communicatively coupled to a cyber security appliance 120, an open source (OS) database server 122, an email defense system 115 with one or more endpoint computing devices 101A-B, and a network defense system 125 with one or more entities 130-142, over one or more networks 110/112, is shown, in accordance with an embodiment of the disclosure. As described above, the AI cyber threat security system 100 may cooperate with the AI adversary red team 105 to initiate a pentest in the form of a software attack, which generates a customized phishing email to spoof a specific user/device/entity of an organization in an email/network defense system and then looks for any security vulnerabilities, risks, threats, and/or weaknesses potentially gaining access to one or more features and data of that specific user/device/entity.

In some embodiments, the AI adversary red team 105 may be implemented as an automated red team simulator (or simulation) of a sophisticated threat actor attack with one or more customizable components of that attack. The AI adversary red team 105 may be customized and/or driven by a centralized AI using and/or modeling a smart awareness of a variety of specific historical email/network behavior patterns and communications of a specific organization's hierarchy within a specific organization. Such AI modeling may be trained and derived through machine learning and the understanding of the organization itself based on: (i) a variety of OS materials such as any OS materials collected from the OS database server 122 and (ii) its historical awareness of any specific email/network connectivity and behavior patterns to target for that organization as part of an offensive (or attacking) security approach.

For example, the AI adversary red team 105 may use an orchestration module (or the like) to implement and orchestrate this offensive approach all the way from an initial social engineering attack at an earlier stage of the pentest to a subsequent payload delivery attack at a later stage of the pentest and so on, as described below in further detail. Similarly, in other embodiments, the AI adversary red team 105 may be implemented as an automated offensive to: (i) intelligently initiate a customized attack on one or more specific security postures of an organization; (ii) subsequently highlight, report, and/or raise awareness of one or more key areas of vulnerabilities and/or risks for that organization after observing the intelligently initiated attack (e.g., such key areas may be formatted and reported in a way tailored for that organization using both the formatting and reporting modules, as described below); and (iii) then allow that organization to be trained on that attack and its impact on those specific security postures, thereby allowing that organization to go in directly to mitigate and improve those compromised security postures going forward. For example, after the customized attack has been initiated, the AI adversary red team 105 may use the result of the phishing simulation to thereby trigger a network simulation (and/or the like) and then produce a report of that network simulation for that organization using the formatting and reporting modules, where the report may highlight to the organization and others which users were spoofed by the phishing simulation(s)—and, if desired, simulate a customized attack from the device(s) of those user(s) and then report on this simulation.

In several embodiments, the AI adversary red team 105 may cooperate with the cyber security appliance 120 to provide feedback on any successful attacks and detections. For example, in the event that the AI adversary red team 105 is successful in pentesting any of the organization's entities in the email and network defense systems 115/125, the AI adversary red team 105 may be configured to at least provide the cyber security appliance 120 (and/or any other predetermined entities) with any feedback on the successful pentest as well as any specifics regarding the processes uses for that successful pentest, such as providing feedback on the specific attack vectors, scenarios, targeted entities, characteristics of the customized phishing emails, payloads, and contextual data, etc., that were used. Similarly, if the cyber security appliance 120 detects an attack in progress, the cyber security appliance 120 may be configured to provide the AI adversary red team 105 with any feedback on the successful detection as well as how the attack was successfully detected (and/or any other feedback that may be beneficial to the AI adversary red team 105).

Accordingly, this positive and negative reinforcement substantially improves the overall defenses of the AI cyber threat security system 100, such that the AI adversary red team 105 is facilitated to modify any specifics and/or contextual information used for the phishing emails, payloads, attack vectors, etc., while also facilitating the cyber security appliance 120 to tune any specific vulnerabilities and processes in light of its detection mechanisms. In this manner, the AI adversary red team 105 may help expose holes or flaws in an organization's security postures that could be exploited by a malicious actor. Particularly, in this manner, the AI adversary red team 105 helps the AI cyber threat security system 100 to identify exactly "how" vulnerable and/or to "what" extent those customized phishing email attacks can go and the overall "actual" impact observed from executing those attacks on the organization's specific security postures—without the substantial overall increase of expenses and testing time generally required when high-end red team professionals are hired. Lastly, the AI adversary red team 105 also helps organizations to create specified risk-modeling scenarios for all of its organizational aspects and entities, which may include: (i) Who is specifically vulnerable in this organization? (ii) Which specific defenses, groups, entities, networks, and so on, are specifically vulnerable in this organization? (iii) What specific type of data is at risk in this organization? (iv) What is the specific degree or extent of severity when/if this organization is attacked (i.e., How vulnerable is this specific organization to any potential attacks)?

Referring back to FIG. 1, the email defense system 115 may include one or more endpoint devices 101A-B depicted as one or more portable computing devices (e.g., laptops), which may be operable under the umbrella of an organization's email network such as the client, institute, company, and/or the like. The email defense system 115 may be implemented to protect all the endpoint devices 101A-B and any other entities that may connect to this organization's email network to communicate and transmit data between each other. For example, the AI cyber security defense system 100 may configure the email defense system 115 to protect all the endpoint computing devices, external/internal email network(s), email-based entities (e.g., such as backup email databases), and/or any other external/internal network systems associated with the organization's email network systems and so on, by detecting and analyzing any particular email connectivity and behavior patterns that are unseal and/or anomalous to those email network systems under analysis. In an example, a behavioural pattern analysis of what are the unusual behaviours of the network/system/entity/device/user under analysis by the machine learning models may be as follows.

The AI cyber threat security (or defense) system 100 as well as the email and network defense systems 115/125 may use any unusual detected behaviour deviating from the normal behaviour and then builds a sequence/chain of unusual behaviour and the causal links between the sequence/chain of unusual behaviour to detect any potential cyber threats. For example, these defense systems 100/115/125 may determine the unusual patterns by (i) filtering out what activities/events/alerts that fall within the window of what is the normal pattern of life for that network/system/entity/device/user under analysis; and (ii) then analysing the pattern of the behaviour of the activities/events/alerts that remain, after the initial filtering process, to determine whether that pattern is indicative of a behaviour of a malicious actor, such as a human, program, and/or any other cyber harmful threat.

Next, these systems 100/115/125 may then return and retrieve some of the filtered out normal activities to help support and/or refute a possible hypothesis of whether that pattern is indicative of a behaviour of a malicious actor. For example, these systems 100/115/125 may use an analyzer module (or the like) to cooperate with one or more AI models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Thereafter, such defense systems 100/115/125 may also have a scoring module (or the analyzer module itself) configured to assign a threat level score or probability indicative of what level of threat does this malicious actor pose (e.g., as shown with the scores depicted in the graph 600 of FIG. 6). Lastly, any of these defense systems 100/115/125 may be configurable through a user interface (UI), by a user, analyst, and/or the like, used to establish one or more predetermined parameters (or inputs), if any, regarding what type of automatic response actions, if any, such modules in such defense systems 100/115/125 should take when different types of cyber threats, indicated by the pattern of behaviours under analysis, are equal to and/or above a configurable threshold level of threat posed by this malicious actor.

As such, the endpoint devices 101A-B in the email defense system 115 may be accessible and communicatively coupled to the AI adversary red team 105, the cyber security appliance 120, and/or the entities 130-142 in the network defense system 125 via the network 110, the second firewall (FW-2) (or the front-end firewall FW-2), and the network 112. For example, as shown in FIG. 1, it should be observed that the endpoint devices 101A-B may communicate with the one or more entities 130-142 in the network defense system 125 respectively through each of the first and second firewalls FW-1/FW-2 as well as each of the first and second networks 110/112. Similarly, the AI adversary red team 105 may communicate with the entities 130-142 in the network defense system 125 via the network 110 (e.g., the Internet), the front-end firewall FW-2, and then the network 112. As noted above, in some embodiments, the AI adversary red time 105 may interact with any of the entities 130-142 to both/either: (i) pentest those entities for training and/or detection purposes, and/or (ii) collect (or query, ingest, probe, etc.) any particular data associated with those entities 130-142 that may be used to generate the customized phishing emails, payloads, attacks, etc.

Furthermore, the endpoint devices 101A-B may be communicatively coupled to the cyber security appliance 120 via the first firewall defense (FW-1) and the first network 110, and to any of the entities 130-142 in the network defense system 125 via the second firewall FW-2 and the second network 112. In most embodiments, each of the devices 101A-B may be resident of its own respective host endpoint agents (e.g., as shown with the host endpoint agents 211A-B on the endpoint computing devices 201A-B depicted in FIG. 2). The endpoint devices 101A-B may include, but are not limited to, a mobile phone, a tablet, a laptop, a desktop, Internet of Things (IoT) appliance, and/or the like. Moreover, the endpoint devices 101A-B may be any variety of computing devices capable of cooperating with each other and/or with any of the entities, devices, networks, and so on, over any of the networks 110/112. In several embodiments, the endpoint device 101A may be configured to operate substantially similar to the endpoint device 101B. However, in other embodiments, the endpoint device 101A may be configured to operate different from the endpoint device 101B based on different user roles, permissions, hierarchical relationships, peer groups, etc., in that organization. The endpoint devices 101A-B may include host agents having multiple modules configured to cooperate with each other.

In some embodiments, the networks 110/112 may be implemented as an informational technology network, an operational technology network, a cloud infrastructure, a SaaS infrastructure, a combination thereof, and/or any other type of network capable of communicatively coupling one or more entities/endpoint devices to one or more other entities/endpoint devices. For example, at least one or more of the networks 110/112 may also include one or more networks selected from, but not limited to, an optical network, a cellular network, the Internet, a Local Area Network (LAN), a Wide Area Network (WAN), a satellite network, a cloud-based network, a fiber network, a cable network, any combinations thereof, and/or any other communications network capable of communicatively coupling the one or more endpoint devices 101A-B, the AI adversary red team 105, and/or the cyber security appliance 120 to the OS database server 122 and any of the other entities (or servers) 130-142. Furthermore, in some embodiments, the network 110 may be an OT network and/or the like (e.g., the Internet), while the network 112 may be an IT network and/or the like.

As shown in FIG. 1, the cyber security appliance 120 may include multiple modules configured to cooperate with each other in conjunction with one or more modules residing in the endpoint devices 101A-B, the AI adversary red team 105, and/or the various entities 130-142 in the network defense system 125. Furthermore, as described below in greater detail in FIG. 4, the cyber security appliance 120 may include one or more modules that may be similar to the one or more modules implemented in the AI adversary red team 105. Such modules of the cyber security appliance 120 may be used to: (i) gather/collect data from the endpoint devices 101A-B and any other associated endpoint computing devices, users, and/or entities; (ii) analyze and score the gathered data; (iii) train AI and/or machine learning model(s) with the analyzed/scored data; (iv) determine, if any, autonomous response(s) based on the comparison between the analyzed/scored data and the trained data; (v) trigger the determined autonomous response(s), if any, directly on the respective host endpoint agents on the respective endpoint devices 101A-B; and (vi) communicate those triggered response(s), if any, with the users associated with those respective endpoint devices 101A-B. Whereas, other modules of the cyber security appliance 120 may be used to display data, metrics, etc., regarding other host endpoint agents residing on other respective local endpoint computing devices, where such data may be unified as translated data from those endpoint computing devices and the endpoint devices 101A-B.

The cyber security appliance 120 may be configured with various modules that reference at least one or more AI and/or machine learning models (e.g., as shown with the AI models depicted in FIG. 4), which may be trained on any normal patterns of life, potential cyber threats, behavior patterns (i.e., behavior pattern of life), host endpoint agents, and/or network patterns of life observed from various/all entities in order to protect such entities from any cyber threats within the AI based cyber threat security system 100. As such, the cyber security appliance 120 may cooperate with multiple (or all) modules and/or instances of the endpoint devices 101A-B, the entities 130-142, and/or the AI adversary red team 105 to defend such entities, devices, users, and so on, that are communicatively coupled to one or more of the networks 110/112.

For example, the cyber security appliance 120 may use the at least one or more AI/machine learning models to analyze the pattern of life data for each endpoint device 101A-B and/or each entity 130-142, where each endpoint device 101A-B and entity 130-142 may be communicatively connected to one or more application programming interfaces (APIs) hosted by the cyber security appliance 120. This allows the cyber security appliance 120 to implement those AI/machine learning models trained on the respective endpoint computing devices 101A-B and entities 130-142 to: (i) analyze the collected pattern of life data for the respective host endpoint agents and the respective entity modules connected to the respective APIs hosted by the cyber security appliance 120; and (ii) then compare that analyzed pattern of life data against a normal pattern of life observed for those respective endpoint computing devices 101A-B and entities 130-142. Accordingly, this cooperation between the cyber security appliance 120 and the endpoint devices 101A-B and entities 130-142 may be used to protect against any unusual cyber security threats that may arise from maliciously harming networks, maliciously harming process chains, and so on—as well as any unusual cyber security threats that may arise from any of the pentesting in the form of customized phishing emails, payloads, attacks, and so on, implemented by the AI adversary red team 105.

As described above, the network defense system 125 may include one or more entities 130-142 depicted as one or more servers (or content-based server machines), which may be operable under the umbrella of the organization's IT networks, internal networks, and/or any other similar networks. The network defense system 125 may be implemented to protect all the entities 130-142 and any other entities that may connect to this organization's IT networks to transfer/store/retrieve/etc. data. For example, the AI cyber security defense system 100 may configure the network defense system 125 to protect all of the respective entities 130-142, external/internal email network(s), network-based entities (e.g., such as internal networking databases), and/or any other external/internal network systems associated with the organization's IT network systems and so on.

As shown in FIG. 1, the network entities 130-142 in the network defense system 125 may be accessible to the AI adversary red team 105, the cyber security appliance 120, and/or the endpoint devices 101A-B in the email defense system 115 respectively via the network 110, the firewall FW-2, and the network 112. Furthermore, it should be noted that the endpoint devices 101A-B may communicate with the entities 130-142 in the network defense system 125 through both firewalls FW-1/FW-2 and both networks 110-112. Similarly, the AI adversary red team 105 may access any of the respective entities 130-142 in the network defense system 125 via the network 110 (e.g., the Internet), the front-end firewall FW-2, and the network 112. Furthermore, the entities 130-142 may be connectable via the front-end firewall FW-2 and network 112 by having certain associated logging capabilities.

As shown in FIG. 1, the entities 130-142 residing in the network defense system 125 may include, but are not limited to, a communication server 130, a domain name server (DNS) 132, a web server 134, an email server 136, a proxy server 138, an FTP Server 140, and a file server 142. Similarly, any other entities (not shown) may be part of and reside in the network defense system 125, which may be relevant to collect data, store data, transfer data, and so on, such as an anti-virus server, a router, a gateway, and/or the like. Each of the entities 130-142 may be connectable via an internal client network such as the network 112. In some embodiments, more than one or more of the entities 130-142 may be associated with its own internal client network (not shown), where each client network may represent an organizational sub-section, department, peer group/team, and so on. Optionally, various of these internal client networks may be further protected behind one or more other internal firewalls (not shown). Note that, in other embodiments, the various entities 130-142 may be further associated with one or more additional client networks, each performing client functions or representing various sub-organization within an organization's network deployment.

Furthermore, as described above, the OS database server 122 may be connectable and used to periodically query, search, and retrieve specific data (or data points) pertaining to the organization and all its entities. For example, such OS data may be used by the AI adversary red team 105 to generate the customized phishing emails, payloads, attack scenarios, and so on, as well as to train and keep up-to-date contextual knowledge of that specific organization and all its specific entities, users, devices, etc. In some embodiments, the AI adversary red team 105 may use the network 110 such as the Internet to gather specific data for specific data points for that organization, which may then be used by the trained AI models and/or AI classifiers for generating various attack scenarios and/or the like (as described below in further detail). Such OS data may be queried and gathered from various spaces including, but not limited to, networking platforms, social media, news media, public search database as well as any specific security product vendors, customer organizations, organization market verticals (e.g., finance, health, transport etc.), and so on.

In most embodiments, the AI adversary red team 105 may include various modules cooperating with each other to generate a variety of customized phishing emails used to then pentest at least one or more of the endpoint devices 101A-B and/or the entities 130-142 in the respective email and network defense systems 115/125. As shown in FIG. 1, the various cooperating modules residing in the AI adversary red team 105 may include, but are not limited to, a collections module, a phishing email generator with a paraphrasing engine, an email module, a network module, an analyzer module, a payloads module with first and second payloads, a communication module, a training module, a simulated attack module, a cleanup module, a scenario module, a UI, a reporting module, a formatting module, an orchestration module, an AI classifier with a list of specified classifiers.

As described herein, the AI adversary red team 105 may be implemented as an AI adversary red team simulator configured to pentest one or more defenses configured by the AI cyber threat defense system 100. The AI adversary red team 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. As noted above, the AI adversary red team 105 may use the trained AI models to cooperate with one or more AI classifier(s) by producing a list of specific organization-based classifiers for the AI classifier.

For example, the list of specific organization-based classifiers may be configured based on the organization, the available OS data, the various customizable scenario attacks and phishing emails, and so on. In some embodiments, the specific organization-based classifiers may include one or more default (or predetermined) classifiers in conjunction with one or more customized classifiers. Furthermore, in several embodiments, the list of specific organization-based classifiers implemented by the AI adversary red team 105 may include, but are not limited to, (i) a content classifier, (ii) a natural language classifier, (iii) a historic knowledgebase classifier, (iv) an OS classifier, (v) an industry group classifier, (vi) a domain classifier, (vii) an attack vectors classifier, and (viii) a hierarchical relationship classifier. For example, the context classifier may be configured to use text trained on a content for a body of an email for that organization; the natural language classifier may be configured to use text trained on a natural language for that organization; the historic knowledgebase and/or OS classifiers may be configured to use text trained on any historical information and/or publicly available information for that organization; the industry group classifier may be configured to use text trained on a particular industry group and/or its particular industry-based terminology for that organization; the domain classifier may be configured to use text trained on a variety of spoofing domains for that organization; the attack vectors classifier may be configured to use text, objects, and visual representations trained on potential spoofing cyber threats for that organization; and the hierarchical relationship classifier may be configured to use text trained on identifying a high-level/low-level employee structure (e.g., management employees vs. entry (or subordinate) employees) based on all of the collected employee titles and roles for that organization.

These specific AI-based classifiers are helpful for generating successful automated and customizable phishing emails. For example, these AI-based classifiers allow the AI adversary red team 105 to be able to: (i) scan a body of an email, a press article, an OS document, a website, and so on; (ii) retrieve (or classify, filter, etc.) the specific data/information needed by that specific AI-based classifier; and (iii) then coordinate with other modules to gather all this specific data from all the specific classified/filtered data points to thereby generate various customized attack scenarios and phishing emails from that specific data of those specific data points. Also, although eight AI-based classifiers are described above, it should be understood that the AI adversary red team 105 may use any number and any type of AI-based classifiers, without limitations.

In several embodiments, the AI adversary red team 105 may include a phishing email generator configured to generate one or more automated phishing emails to pentest the email defense system 105 and/or the network defense system 125. The phishing email generator may be configured to cooperate with the trained AI models to customize the automated phishing emails based on the identified data points of the organization and its entities. For example, these customized phishing emails may be used to then at least initiate one or more specific attacks on one or more specific users in the organization.

For example, the phishing email generator may use one or more "phishing" determinations to generate the customized phishing emails, including, but not limited to, (i) determining the specifics of each email system for that organization, such as determining specific targeted users, categorized email groups, and so on; (ii) determining the specifics of each IT network systems for that organization, such as determining the IT network systems, firewalls, backdoors, and/or any other similar security defenses; and (iii) determining the specifics of the hierarchal relationships, structures, and such for that organization, such as identifying and assessing the organization's name, the user names, the email signatures, the body content and other data from the users emails, content between various users, etc.

In some embodiments, the AI adversary red team 105 may include a paraphrasing engine configured to receive email data from the identified data points and then break up that received email data into different segments of an email. For example, the segments of the email may include a subject line, a body content, and a signature line. The paraphrasing engine may be further configured to rephrase the text, objects, and/or visual representations from that received email data, such that one or more particular segments of some customized phishing emails are altered and/or slightly different from one or more particular segments of other customized phishing emails.

In several embodiments, the AI adversary red team 105 may include a payload module configured to cooperate with the phishing email module in order to generate at least one or more of a first payload and a second payload, which may be attached to the one or more customized phishing emails. As noted above, the first payload may be configured as a non-executable payload, and the second payload may be configured as an executable payload. In some embodiments, the AI adversary red team 105 may include a training module configured to cooperate with the payload module. For example, the train module may be configured to provide more awareness of the one or more specifically attacked users and other entities in the organization based on the specific attack scenarios, phishing emails, payloads, and so on.

In several embodiments, the AI adversary red team 105 may include a simulated cyber-attack module configured to use the second payload attached to the customized phishing emails to thereby pentest, for example, the network defense system 125 and its entities 130-142. For example, this simulated second payload may be successfully activated and thus executed on that device and onto that network, where such simulated second payload may be tracked in that network by: (i) tracking beacon signals being produced from that payload, (ii) tracking a specific pattern of TCP packets being produced from that payload in the traffic spans; and/or (iii) using other similar network tracking/monitoring processes.

In some embodiments, the simulated cyber-attack module may be configured to cooperate with the one or more trained AI models to customize the one or more specific attacks in light of the one or more specific attack scenarios configured for that network defense system 125 and its entities 130-142. These specific attack scenarios may be implemented by a scenario module residing in the AI adversary red team 105. The scenario module may be configured to cooperate with an orchestration module as well as the one or more trained AI models to generate the one or more specific attack scenarios. Furthermore, the generated specific attack scenarios may be particularly customized based on the email and network connectivity and behavior pattern data observed for any of the specific organizational entities in the AI cyber threat defense system 100.

In several embodiments, the AI adversary red team 105 may include an analyzer module configured to cooperate with the AI classifier in producing the list of the specific organization-based classifiers, as described above. The analyzer module may be configured to cooperate with the one or more trained AI models to identify one or more normal pattern of life for the one or more entities of the organization in the email and network defense systems 115/125. In an embodiment, the AI adversary red team 105 may also include a communications module configured to cooperate with the analyzer module and communicate with one or more APIs hosted by the cyber security appliance 120. In several embodiments, one or more of the AI adversary red team 105 and/or the cyber security appliance 120 may include a profile manager module configured to communicate and cooperate with one or more modules of the AI adversary red team 105.

For example, the profile manager module may be configured to maintain a profile tag on each entity of the organization connecting to a network under analysis (e.g., one or more of the first and second networks 110/112) based on its email and network connectivity and behavior pattern data, such that the profile manager module may be configured to then supply any profile tags for any of the entities "actually" connecting to and/or being pentested in the network under analysis. Furthermore, in some embodiments, the AI adversary red team 105 may include a collections module configured to monitor and collect specific organization-based data from multiple software processes executing on, for example, one of more of the host endpoint agents residing on the respective endpoint computing devices 101A-B in the cyber threat defense system 100. The communications module and the collections module may cooperate with each other to send all of the email and network connectivity and behavior pattern data to the cyber security appliance 120 regarding the specific organization-based data monitored and collected from those respective endpoint computing devices 101A-B connecting to the one or more networks 110/112 under analysis.

In several embodiments, the AI adversary red team 105 may include a network module configured to cooperate with one or more network probes ingesting traffic data for network entities, network devices, and network users in the network defense system 125. Whereas, in other embodiments, the AI adversary red team 105 may also include an email module configured to cooperate with one or email probes for ingesting email traffic data for email entities, email devices, and email users in the email defense system 115. Additionally, the profile manager module may be configured to maintain the profile tags on each of those entities, devices, and users based on their behavior pattern data observed by the email and network modules and/or the trained AI models modeling the normal pattern of life for those entities, devices, and users in the respective email and network defense systems 115/125, thereby obtaining the specific email and network connectivity and behavioral knowledge/patterns for each specific user, device, and entity in that specific organization.

In some embodiments, the collections module may be configured to cooperate with the communication module as well as the analyzer module to gather external data from the OS database server 122 (and/or the like), which allows the collection module to thereby collect and gather specific data for that organization, its entities, and its users. As described above, the OS database server 122 may include at least one or more of (i) an online professional networking platform for organizations and users, (ii) an online website of an organization with pages of their industry groups, teams, and users, and (iii) an online public search database. Lastly, in several embodiments, the AI adversary red team 105 may include a cyber threat module configured to reference one or more machine-learning models trained on potential cyber threats in conjunction with the trained AI models and AI classifiers. The cyber threat module may be configured to cooperate with at least one or more of the payload module, scenario module, and/or simulated attack module to generate the specific attack scenarios executed and pentested by the AI adversary red team 105 into the email and network defense systems 115/125 of the cyber threat defense system 100. Also, as described above for some embodiments, the UI module may be configured to cooperate with the orchestration module to provide one or more user input parameters specifically tailored to the organization and specified by a particular user in that organization.

For example, these user input parameters provided by the UI module may include: (i) a first parameter configured to identify a predetermined attack to pentest the cyber threat defense system; (ii) a second parameter configured to select a predetermined user and entity to be attacked with the identified predetermined attack; (iii) a third parameter configured to establish a predetermined threshold to execute the identified predetermined attack on the selected predetermined user and entity; and (iv) a fourth parameter configured to restrict one or more predetermined users and entities in the organization from being attacked. Also, in some examples, the predetermined threshold may be configured based on at least one or more of (i) a predetermined time schedule allowed for that attack, (ii) a predetermined maximum number of paths allowed for that attack, and (iii) a predetermined maximum number of compromised users, devices, and entities allowed for that attack.

In these embodiments, the payload module may be used to detect lateral movement of any compromised (or infected) entities. Respectively, in those embodiments, the cleanup module may then be used to clean up (or wipe) any entities that were compromised by either the initial activation of the payload (i.e., by having that user being spoofed to click on that payload) and/or the subsequent execution of that payload from that initial (or source) entity to any other entities, such as and other paths, devices, networks, domains, and so on, that have been compromised as the threat of that payload spreads through the network under analysis. Additionally, in some embodiments, the cleanup module may also be configured and used to clean up when/if a vulnerability threshold is triggered in that network under analysis (i.e., the vulnerability threshold may be predetermined by a particular user in that organization, such as an IT analyst or the like).

For example, the cleanup module may be particularly configured with one or more automated responses/actions such as, but not limited to, (i) resetting any compromised passwords, (ii) clearing any residual information from the respective phishing emails, (iii) shutting down any compromised entities, (iv) sending alerts to any particular users associated with those compromised entities and any IT analysts (or the like) for that organization, and (v) any other predetermined responses/actions. Note that, in most embodiments, the cleanup module may only be needed (or applicable) when/if the payload module is configured to "actually" execute those payloads during the later stages of the pentesting.

Note that, according to most embodiments, any instructions of any modules of the endpoint devices 101A-B shown in FIG. 1 may be scripted to be stored in an executable format in one or more memories and implemented by one or more processors of the respective endpoint computing devices.

Figure 2:
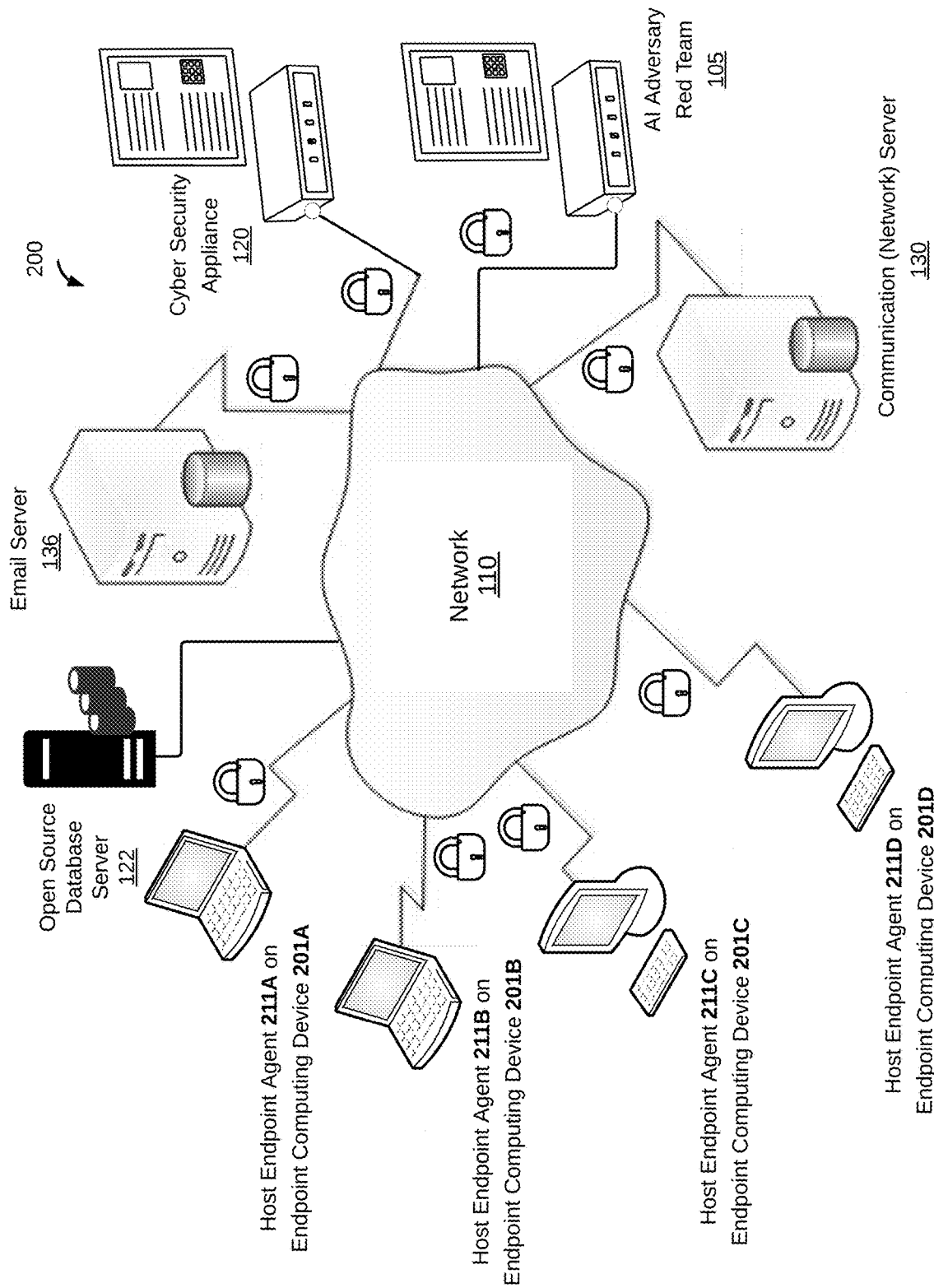
FIG. 2 illustrates a block diagram of an AI cyber security system having an AI adversary red team configured to cooperate with a cyber security appliance to pentest a plurality of endpoint computing devices and internal servers that are communicatively coupled to a network, in accordance with an embodiment of the disclosure.

Referring now to FIG. 2, an AI based cyber threat security system 200 having an AI adversary red team 105 communicatively coupled over a network 110 with at least one or more of a cyber security appliance 120, host endpoint agents 211A-D, endpoint computing devices 201A-D, and/or entities 122/130/136 is shown, in accordance with an embodiment of the disclosure. Similar to the AI adversary red team 105 depicted above in FIG. 1, the AI based cyber security system 200 may implement the AI adversary red team 105 depicted in FIG. 2 to pentest any of the depicted agents 211A-D, devices 201A-D, and/or entities 130/136 via the one or more secure communication channels established with the network 110. In several embodiments, as described above, the AI adversary red team 105 and/or the cyber security appliance 120 may be configured to receive any collected email and network activities and behavior pattern data from any of the endpoint devices 201A-D, the host endpoint agents 211A-D, and/or the entities 130/136. Such host endpoint agents 211A-D may be located and executed on the respective endpoint computing devices 201A-D.

The AI based cyber threat security system 200 depicted in FIG. 2 may be substantially similar to the AI based cyber threat security system 100 depicted in FIG. 1. As such, in most embodiments, the endpoint devices 211A-D, the network 110, the AI adversary red team 105, the AI based cyber security appliance 120, and the entities 130/136 depicted in FIG. 2 may be substantially similar to the endpoint devices 101A-B, the network 110 (and/or the network 112), the AI adversary red team 105, the AI based cyber security appliance 120, and the entities 130/136 depicted and described in great detail above in FIG. 1.

In some embodiments, the network 110 may be: (i) an informational technology network, (ii) an operational technology network, (iii) a cloud infrastructure, (iv) a SaaS infrastructure, and/or (v) any combination thereof capable of being communicatively coupled to each of the respective AI adversary red team 105, the cyber security appliance 120, the endpoint computing devices 201A-D, and/or the entities 122/130/136. The network 110 may be used to communicatively couple the endpoint computing devices 201A-D to at least one or more of the entities 122/130/136 and/or the cyber security appliance 120. Furthermore, as shown in FIG. 2, the endpoint computing device 201A may be communicatively coupled to the network 110 via a secure channel, whereas the entity 122 (i.e., the OS database server) may be communicatively coupled to the network 110 via an unsecure channel. In most embodiments, the one or more entities 122/130/136 may include, but are not limited to, any type of server, database, data store, and/or cloud-based server, service, application, etc. For example, the entities 130/136 may be similar to the entity 122, with the exception that the entity 122 is communicatively coupled over the unsecure (or open) channel, and thus has limited functions, network capabilities, and is not capable of receiving secured data from any of the other depicted entities in FIG. 2. The endpoint computing devices 201A-D and entities 122/130/136 may be any variety of computing devices capable of cooperating with the respective host endpoint agents 211A-D, the AI adversary red team 105, and the cyber security appliance 120 over the network 110.

In some embodiments, the host endpoint agents 211A-D may be configured to reside on their respective endpoint devices 201A-D and to: (i) have a low system impact on their respective endpoint devices 201A-D and runs without degrading its performance significantly; (ii) monitor the "pattern of life" of their respective endpoint devices 201A-D (e.g., including monitoring at least one or more of: (a) process behavior (use of network, filesystem, etc.), (b) relationships between processes (parent/child, shared files, IPC, etc.), and/or (c) user behavior (applications commonly used, IT habits, etc.); (iii) make reports on pattern of life metadata, events and alerts to an API whenever connected to the internet or LAN, and while offline, cache data to deliver when possible; (iv) assist in performing IT audits while also completing pattern of life data and events (e.g., including assisting in at least one of more of: (a) audit system details, for example installed operating systems, installed software, software versioning, security update status, etc.; (b) gather system usage activity such as shutdown periods, login failures, file modifications, network connections, etc.; and/or (c) record use of external devices or transfer protocols (e.g., USB usage, Bluetooth usage, email usage, etc.); and/or (v) lastly react autonomously to anomalies in pattern of life (e.g., including responding with at least one or more actions to: (a) cooperate with the appliance 120 with its significantly greater processing power, sets of models including, for example, pulling when available, any actions to be taken and/or be able to take a limited set of actions when a connection to the cyber defense system 200 is not available; (b) provide an operator with the ability to enable the respective host endpoint agents 211A-D to perform a select number of relatively simple actions, when predefined conditions of suspicious behavior and/or anomaly scores/levels are met, independent of the cyber defense appliance; and/or (c) simple and default actions such as actions to prompt user, quarantine a suspicious process (from network access and process as well as internal computing device's process and filesystem), shutdown the offending processes, and so on).

Continuing with FIG. 2, the AI adversary red team 105 may initiate one or more pentests in the form of software attacks via customized phishing emails on various entities and users of that organization, which thereby looks for security vulnerabilities, risks, weaknesses, potentially gaining access to the entities' features and data. For example, the cyber threat defense system 200 may use the AI adversary red team 105 in cooperation with AI modeling and AI classifiers (as described above) to create the automated phishing emails that are tailored to that organization and attack that organization and spoof its entities/users using its own contextual language/information specifically collected for that organization. That is, in most embodiments, the AI adversary red team 105 generates customized e-mails tailored to include public information known about the company (or organization) in order to generate the customizable and automated spoof/fake phishing emails from another user of that company. The AI adversary red team 105 may require an input of a company name and associated domain (or network entity) as well as with one or more optional input parameters, such as an example email signature, a content of a body of an email, a subject line, and so on.

For these embodiments, the AI adversary red team 105 may then locate all identifiable employees via public open sources databases/servers 122, such as LinkedIn, industry group and team pages on a company's website, Google, press releases, etc. and then retrieves the employee names, job titles, and another needed/desired inputs. For example, the AI adversary red team 105 may use one or more of its modules, AI models, and AI classifiers to attempt to automatically identify employee relationships and hierarchical structures for that organization based on retrieved names, job titles, and so on. Accordingly, the AI adversary red team 105 may then use the AI classifiers and/or the like to generate the customized phishing emails based on the one or more customizable threat scenarios trained from the identified relationships and hierarchical structures.

For example, these threat scenarios may include, but are not limited to, (i) Interesting and relevant news article from manager to subordinate, (ii) A critical security patch reminder from manager to subordinate; (iii) Identify payroll management and spoof from relatively important employee to change the details of monthly salary payments; (iv) Identify accounts/finance employees to target for business email compromise style attacks and/or similar styles (e.g., an attempt to submit a fake Purchase Order and so on); and/or (v) and other similar customizable activities and scenarios for attacks on that company.

In most embodiments, the AI adversary red team 105 may be configured to generate all these scenario and simulated attacks that will produce a spoofed email from senior employees to subordinates suggesting that the subordinate take a look at the link or attachment (i.e., the first and/or second payloads). In addition, the payloads generated by such AI adversary red team 105 may include various macro-enabled office documents (or similar delivery mechanisms and attack vectors) attached to such emails, which claim to be key information related to the subject and/or scenario described above. For an example, based on the above scenarios, the AI adversary red team 105 may automatically retrieve recent news articles related to that company—and then using all or selected portions of the information from the retrieved news articles as part of one or more segments of the phishing email, such as the subject line, email body, signatures, and so on. For example, the preamble to the news article may be run through the paraphrasing engine to ensure that the content is sufficiently different to avoid sending the same content to multiple users as wells as slightly altered subject RE lines and/or signature lines when/if multiple phishing emails are being generated. In some embodiments, the auto generated emails may be sent to pentest (or train, identify potential risks, etc.): i) the employees, ii) the cyber defense software protecting the system so that better training and augmenting of email defenses may occur and create better defenses, and (iii) any other specified users/entities of that company. Lastly, for some embodiments, the automated software defenses may check to see the sender email address would not trace directly back to the fake user.

On the other hand, where the endpoint computing device already possesses a third-party endpoint agent, the system 200 may use the AI adversary red team 105 (and, if needed, the appliance 120) to adapt the third-party endpoint to supply similar pattern of life data and take a limited range of actions. The appliance 200 may include a unifying endpoint detection and response process (EDR)/endpoint protection platform (EPP) translator configured to understand and be able to exchange communications with other endpoint security processes on the endpoint computing-device. The unifying EDR/EPP translator may have a set of connector APIs to map conveyed information from a plurality of different known endpoint security processes including one of more EDRs, EPPs, and any combination thereof. An example set of connector APIs in the unifying EDR/EPP translator to communicate with other security processes may include, but are limited to, default operating system logging solutions such as windows event forwarding, Sysmon, and/or any popular EDRs/EPPs such as antivirus/malware applications, etc.

Note, the EDR processes may be endpoint security tools that may both detect and respond to cyber exploits as well as provide a wealth of data including alerting, and forensic analysis. An EPP may be an integrated security solution designed to detect and block threats at device level. Typically this includes antivirus processes with known signature-based detection, anti-malware processes with known signature-based detection, data encryption processes, personal firewalls, intrusion prevention (IPS) processes and data loss prevention (DLP) processes. Note, the set of connector APIs for the unifying EDR translator may structurally reduce the number of APIs by mapping conveyed information from a plurality of different known EDRs & EPPs to a central tier of APIs, which further condenses the number of separate conversions to be able to take in EDR information as well as from popular EPPs.

Also, in some embodiments, the AI adversary red team 105 may employ existing security processes, EDRs and/or EPPs from other vendors running on the endpoint computing devices/server 201A-D/202A to function as versions of the host endpoint agents 101A-E. The AI adversary red team 105 may achieve interoperability with other security processes on any of the endpoint computing devices/server 201A-D/202A with the set of connector APIs to tap into the diverse capabilities of multiple EDRs and/or EPPs. The translator connector APIs request relevant details from the one or more existing third-party agents on the endpoint computing devices/server 201A-D/202A to feed back through the unifying translator and into the AI adversary red team 105 as pattern of life data. Note, although the AI adversary red team 105 may be able to utilize existing third party endpoint agents and logging solutions to gather end-computing device pattern of life data, this data may often be incomplete or requires interaction with multiple different agents as the third-party agents are merely utilized rather than designed for this purpose of collecting pattern of life data. As such, the unifying translator allows the AI adversary red team 105 to utilize third party agents when/if installing any of the respective host endpoint agents 101A-E is not feasible, but this may not be a preferable or as data-rich solution.

Furthermore, as described above, each of the host endpoint agents 101A-101D may also have their own collections module cooperating with two or more probes that include, but are not limited to, at least: (i) a first type of probes specifically configured to collect data from an operating system of its respective endpoint computing devices/server 201A-D/202A; (ii) a second type of probes specifically configured to collect data from each individual process executing on that endpoint computing devices/server 201A-D/202A; and (iii) a third type of probe configured to collect system event and logging data from that endpoint computing devices/server 201A-D/202A. The collections module may cooperate with one or more of the third type of probes to monitor and record events occurring on those endpoint computing devices/server 201A-D/202A. The collected data from the operating system and individual processes along with the recorded events may be sent in the collected pattern of life data by the collections modules to the AI adversary red team 105.

The collections module's framework runs probes in communication with the other various modules and data stores. The first type of probes may monitor the operating system to gather profiling pattern of life data about the system state. This information may include, for example, installed applications, software versions, operating system and pending security updates. Meanwhile, the second type of probes may monitor individual processes themselves to gather process pattern of life data such as, but not limited to, associations between parent and child processes, network connectivity and process interaction, file system interaction, etc. Lastly, the third type of probe may detect and record events and collaborate with default system event logging tools. This probe may gather events such as, for example, connections to new Wi-Fi or wired networks, interaction with peripheral devices (including, but not limited to, universal serial bus, visual displays, etc.) and system usage events such as power management, file modification, etc.

In these embodiments, the network module of the AI adversary red team 105 may be used to analyze metrics from these entities (e.g., network entities including servers, networking gateways, routers, each endpoint agent connected to the network) using one or more models. The models may be a self-learning model trained on a normal behavior of each of these entities. The self-learning model of normal behavior is then continuously updated with actual behavior of that entity. The self-learning model of normal behavior is updated when new input data is received that is deemed within the limits of normal behavior. The modules may compare the analyzed metrics received from the probes and hooks to a moving benchmark of parameters that correspond to the normal pattern of life for the computing system used by the self-learning model. Accordingly, the cyber threat module may then determine, in accordance with the analyzed metrics and the moving benchmark used by the self-learning model of normal behavior of the entity, an anomaly score indicative of a likelihood of a harmful cyber threat and its severity.

Note, a normal behavior threshold may be used by the models as a moving benchmark of parameters that correspond to a normal pattern of life for the entities. The normal behavior threshold is varied according to the updated changes in the computer system allowing the model to spot behavior on the computing system that falls outside the parameters set by the moving benchmark.

Again, as described above, any of the host endpoint agents 101A-E may have an autonomous response module that causes one or more autonomous actions to be taken to contain the cyber threat when detected and when: (i) that endpoint agent is not connected to the network 110 where the AI adversary red team 105 is installed, (ii) the AI adversary red team 105 is unavailable to communicate with the endpoint agent, and/or (iii) any combination of (i) and/or (ii) occur. The autonomous response module located in the that endpoint agent may take one or more autonomous response actions preapproved by a human user when predefined conditions of suspicious behavior and/or anomaly level are met, independent of the AI adversary red team 105 to autonomously attempt to contain the potential cyber threat.

Again, the autonomous response module, rather than a human taking an action, may be configured to cause one or more autonomous actions to be taken to contain the cyber threat when a potential cyber threat is detected. It should be understood that, in some embodiments, the AI adversary red team 105 may have the autonomous response module, and/or one or more portions of the autonomous response module may exist on that host endpoint agent, while the majority portion may remain on the appliance 120 due to greater processing power. A user programmable interface hosted on the appliance 120 having any of fields, menus, and icons may be configured to allow a user to preauthorize the autonomous response module to take actions to contain the cyber threat. The user programmable fields/menus/icons for allowing preauthorization may include, but are not limited to, killing individual processes, revoking specific privileges, preventing the download of specific files, allowing only processes observed in the pattern of life for peer devices to be active for a set period, and asking other EPPs to quarantine suspicious files, etc., while not disturbing operations of other processes going on inside that device.

The user programmable interface has the granularity in options available to the user to program the autonomous response module to take very specific actions such as killing individual processes, revoking specific privileges while still permitting other permissions for that user, getting live terminal access, preventing the download of specific files, allowing only processes observed in the pattern of life for peer devices to be active for a set period, asking other EPPs to quarantine suspicious files, etc. while not shutting down an entire device, or blocking all outside communications, or revoking one or more but not all of that user's privileges. Actions such as revoking only some user privileges or enforcing the peer pattern of life allow the user to continue working but just not perform certain connections or run certain processes, which most likely a malicious piece of software was initiating, such as accessing and downloading sensitive files while the user, completely unaware of the malicious software using their credentials, is doing a normal activity for that user such as typing out a document or entering data into a program.

Example autonomous actions available to be pre-approved by a human user for the autonomous response module may include a general prompt to the user on the display screen of the endpoint computing device along with the action of: (i) prevent or slow down activity related to the threat; (ii) quarantine or semi-quarantine people, processes, devices; and/or (iii) feed threat intelligence to EPP and EDR processes and devices to take third party or vendor specific actions such as quarantine or firewall blocks. Note that, in most embodiments, such actions may be triggered without disrupting the normal day to day activity of users or other processes on that endpoint computing device.

Again, the communications module may send collected pattern of life data to the AI adversary red team 105 and/or the appliance at periodic intervals when connected to the network 110 where they are installed. The communications module may also send collected pattern of life data to one or more memories of that endpoint computing device (i) when not connected to the network 110, where the AI adversary red team 105 and the appliance 120 are installed as well as (ii) when the cyber security appliance 120 is unavailable; and (iii) then in either situation, delivers the collected pattern of life data when possible.

Figure 3:
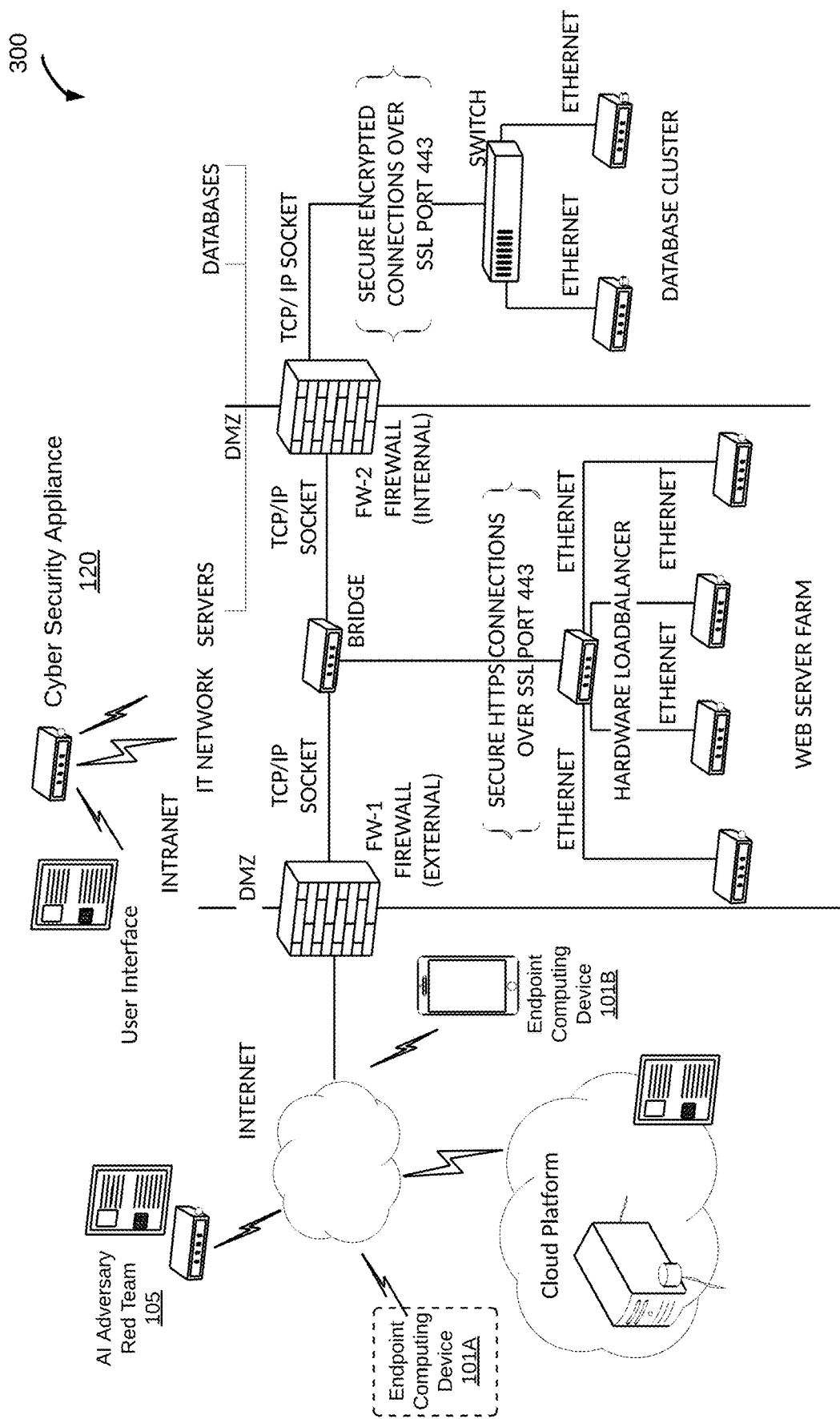
FIG. 3 illustrates a block diagram of an exemplary AI based cyber security platform having a cyber security appliance configured to protect various network devices and endpoint computing devices communicatively coupled over a network from being pentested by an AI adversary red team, in accordance with an embodiment of the disclosure.

Referring now to FIG. 3, an AI based cyber security network environment 300 having an AI adversary red team 105 in cooperation with a cyber security appliance 120 configured to protect endpoint devices 101A-B and various other network devices is shown, in accordance with an embodiment of the disclosure. As shown in FIG. 3, the AI based cyber security network environment 300 may use the AI adversary red team 105—in cooperation with the cyber security appliance 120 if needed—to use one or more customized phishing emails to pentest any of the endpoint computing devices 101A-B and/or any of the other network entities and devices in this network environment 300 in order to then train and specifically identify any potential vulnerabilities/risks in this environment 300. The AI based cyber security network system 300 depicted in FIG. 3 may be configured similar to the AI cyber threat security systems 100 and 200 depicted in FIGS. 1-2. As such, in most embodiments, the endpoint devices 101A-B, the AI adversary red team 105, and the cyber security appliance 120 depicted in FIG. 3 may be substantially similar to the endpoint devices 101A-B, the AI adversary red team 105, and the cyber security appliance 120 depicted in FIGS. 1-2.

The AI based cyber security network environment 300 may be configured as a communications network. The network may include one or more networks selected from, but not limited to, an optical network, a cellular network, the Internet, a LAN, a WAN, a satellite network, a 3$^{rd}$ party "cloud" environment, a fiber network, a cable network, and/or any combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system) may communicate with the server(s). The client computing system may include, for example, the software application or the hardware-based system in which may be able exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud user's cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be configured to utilize a protocol, such as hypertext transfer protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access may be configured to engage in: the request and response cycle from all web browser based applications; the request and response cycle from a dedicated on-line server; the request and response cycle directly between a native application resident on a client device and the cloud-based remote access to another client computing system; and/or combinations thereof.

In an embodiment, the server computing system may include a server engine, a web page management component, a content management component, and a database management component. The server engine may perform basic processing and operating system level tasks. The web page management component may handle creation and display, or routing of web pages or screens associated with receiving and providing digital content and digital advertisements. Users (e.g., cloud users) may access one or more of the server computing systems by means of a uniform resource locator (URL) associated therewith. The content management component may handle most of the functions in the embodiments described herein. The database management component may include, but is not limited to, storage and retrieval tasks with respect to the database, queries to the database, storage of data, and so on.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any hypertext markup language (HTML), wireless access protocol (WAP) enabled client computing system (e.g., the client computing system), and/or any equivalent thereof.

The client computing system may host a browser and/or a specific application to interact with the server computing system. Each application has a code scripted to perform the functions that the software component is configured to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

Figure 4:
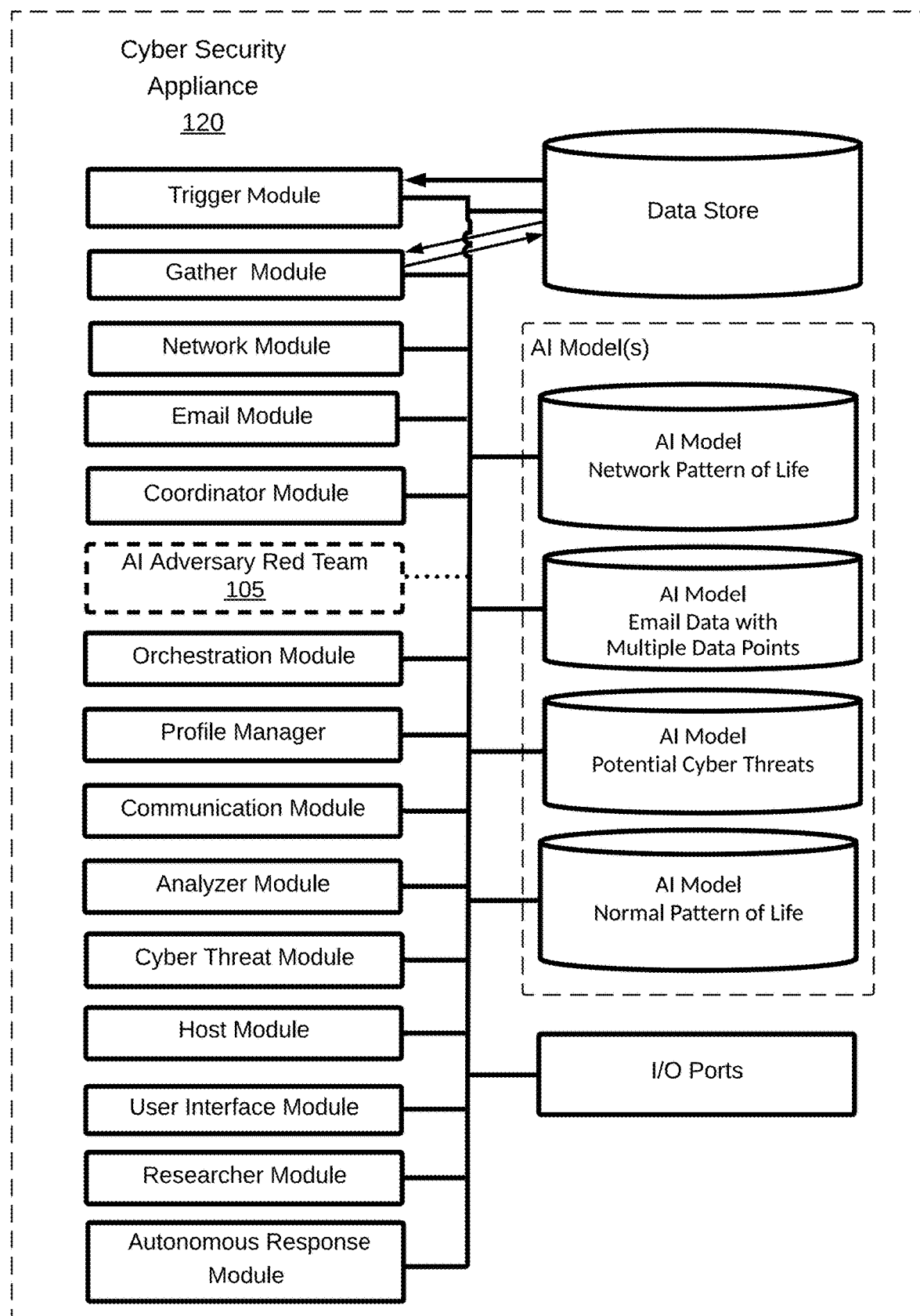
FIG. 4 illustrates a block diagram of a cyber security appliance with various modules cooperating with various machine learning models trained on the discrete pattern of life of one or more email and network connectivity and behavior pattern data, in accordance with an embodiment of the disclosure.

Referring now to FIG. 4, a cyber security appliance 120 with various modules cooperating with various AI/machine learning models trained on various observed data points is shown, in accordance with an embodiment of the disclosure. The cyber security appliance 120 may cooperate with the AI adversary red team 105 depicted in FIG. 1 to protect against cyber security threats from maliciously harming networks as well as from maliciously harming any entities connecting to that network of the organization, where the cyber security appliance 120 is installed, by implementing the AI adversary red team 105 (and, if needed, in cooperation with the cyber security appliance 12) to use customized phishing emails to pentest any of those connected entities in that network, such that the cyber security appliance 120 and any other defenses are adequately trained on any actual spoofing attacks used to identify all potential risks for that organization and all its entities and users. The cyber security appliance 120 and the AI adversary red team 105 depicted in FIG. 4 may be substantially similar to the cyber security appliance 120 and the AI adversary red team 105 depicted above in FIGS. 1-3. As such, in most embodiments, any of the modules, trained AI models, and AI classifiers referenced and discussed in FIG. 4—in reference to the AI adversary red team 105 in conjunction with the cyber security appliance 120 depicted in FIG. 4—may be substantially similar to any of the modules, trained AI models, and AI classifiers depicted and discussed in FIGS. 1-3.

The cyber security appliance 120 may include components one or more modules, stores, and/or components, including, but not limited to, a trigger module, a gather module (or a collections module), a data store, a host module, a graphical user interface module, a researcher module, an autonomous response module, at least one input or output (I/O) port to securely connect to other network ports as required, and the AI adversary red team 105 with any of the cooperating modules described herein, such as, but not limited to, a phishing email generator with a paraphrasing engine, a network/email module, an analyzer module, a payloads module with first and second payloads, a communication module, a training module, a simulated attack module, a cleanup module, a scenario module, a UI, a reporting/formatting, an orchestration module, an AI classifier with a list of specified classifiers, and so on.

As noted above, the AI adversary red team 105 with one or more of cooperating modules in FIG. 4 may be substantially similar to the AI adversary red team 105 and all of its cooperating modules depicted in FIG. 1. For example, in most embodiments, the AI adversary red team 105 may be configured to pentest one or more defenses of a cyber threat defense system. The AI adversary red team 105 may be configured to pentest an email defense system and/or a network defense system of cyber threat defense system, which may be configured to protect an organization and its entities and users. In some embodiments, the AI adversary red team 105 may be trained based on one or more AI models that are trained with machine learning on contextual knowledge of the organization and also used to identify various data points from that contextual knowledge. For example, the contextual knowledge may include language-based data, email and network connectivity and behavior pattern data, and/or historic knowledgebase data pertaining to the organization. In other embodiments, the AI adversary red team 105 may cooperated with the trained AI models and one or more AI classifiers to produce a list of specific organization-based classifiers for those AI classifiers. In these embodiments, the AI adversary red team 105 may include a phishing email generator configured to generate one or more automated phishing emails to pentest at least one or more of the email and network defense systems and any other defenses associated with that organization.

The AI adversary red team 105 may use the phishing email generator to cooperate with the trained AI models to customize the generated and automated phishing emails based on the identified data points from that organization and its entities and users. Moreover, the AI adversary red team 105 may then use the customized phishing emails to initiate one or more specific attacks on one or more specific users and entities in one or more of the specific defense systems used to protect that organization. In some embodiments, the AI adversary red team 105 may configure a paraphrasing engine in the phishing email generator in order to receive email data from the one or more identified data points and then break up the received email data into two or more segments of an email. For example, the two or more segments of the email may include one or more customizable subject lines, body content, and signature lines. In additional embodiments, the paraphrasing engine may also be configured to rephrase that received email data, such that one or more particular segments of the one or more customized phishing emails are different from each other when generating multiple phishing emails with multiple spoofing payloads and so on. For example, the AI adversary red team 105 cooperates and uses the paraphrase engine to ensure that the subject lines, body content, and/or signature lines of all the customized phishing emails are sufficiently different from each other to avoid sending the same contextual segments, text, attachments, etc., for all the phishing emails being generated for training and pentesting purposes.

In some embodiments, the AI adversary red team 105 may use a payload module in cooperation with the phishing email module to generate at least one or more first payload and second payloads that are sent as spoofing attachments, links, vectors, etc., with the customized phishing emails. The AI adversary red team 105 may utilize the first payloads with a training module cooperating with the payload module to train the one or more attacked specific users in that organization based on any successfully activated and non-executable first payloads attached to the customized phishing emails In several embodiments, the AI adversary red team 105 may include a simulated cyber-attack module to use the attached second payloads of the customized phishing emails to spoof a specific user in the network defense system of that organization. As described above, the simulated cyber-attack module may be configured to cooperate with the trained AI models and AI classifiers to customize the initiated specific attacks based on one or more specific attack scenarios for that network defense system particularly customized with any email and network connectivity and behavior pattern data specific to that attack, user, scenario, contextual knowledge, and so on, in those systems for that organization.

Furthermore, the cyber security appliance 120 may include one or more AI and machine learning models such as, but not limited to, a first set of AI models (i.e., the AI model network pattern of life) trained different aspects of the network including users, devices, system activities and interactions between entities in the system, and other aspects of the system; a second set of AI models (i.e., the AI model host pattern of life) trained on pattern of life of host/endpoint computing devices hosting instances of the respective endpoint agents (e.g., trained on the pattern of life pertaining to the endpoint devices 101A-B) including: the users, the multiple software processes, relationships between the software processes, device operation, operating system configuration changes, and other such aspects; a third set of AI models (i.e., the AI model potential cyber threats) trained on any variety of potential cyber threats; and one or more other types of AI models (i.e., the AI model normal pattern of life), each trained on different types of computing devices and operating systems for each type of particular computing device, and other aspects of the systems, as well as other similar components in the cyber security appliance 120. The one or more modules utilize probes to interact with entities in the network (e.g., as described above with the probes depicted in FIG. 3). It should be noted that many of these modules shown in FIG. 4 are substantially similar to the respective modules used in the endpoint devices 101A-B and/or the cyber security appliance 120 described above in FIGS. 1-3, such that those respective modules may be referenced herein without any limitation.

The trigger module may detect time stamped data indicating one or more events and/or alerts from unusual and/or suspicious behavior/activity that are occurring and may then trigger that something unusual is happening. Accordingly, the gather module may be triggered by specific events and/or alerts of anomalies, such as an abnormal behavior, a suspicious activity, and/or any combination thereof. The inline data may be gathered on the deployment from a data store when the traffic is observed. The scope and wide variation of data available in the data store results in good quality data for analysis. The collected data may be passed to the various modules as well as to the data store.

The gather module (or the collections module) may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation may occur between the gather module and the various modules including, but not limited to, the network module, the host endpoint agent coordinator module, the communications module, the cyber threat module, and/or the researcher module.

In addition, the coordination occurs between the above modules and the one or more AI models trained on different aspects of this process. The cyber threat module may cooperate with the network module and the host endpoint agent coordinator module to identify cyber threats based on analysis and determinations by the analyzer module, the anomaly score module, and such. Each hypothesis of typical cyber threats may have various supporting points of data and other metrics associated with that possible threat, such as a human user insider attack, inappropriate network behavior, inappropriate behavior in a particular endpoint computing device, etc. The AI/machine-learning algorithm may look at the relevant points of data to support or refute that particular hypothesis of what the suspicious activity or abnormal behavior related for each hypothesis on what the suspicious activity or abnormal behavior relates to. Networks may have a wealth of data and metrics that may be collected. The gatherer modules may then filter or condense the mass of data down into the important or salient features of data. In an embodiment, the various modules may be combined or kept as separate modules.

The network module and/or the communications module may receive data on the network from the set of probes. For example, each host endpoint agent 101A-B may communicate and exchanges information with the cyber security appliance 120. The network and/or communications modules may reference any of the various available AI machine learning models. The endpoint agent coordinator module may reference one or more of the AI models, using machine learning and Artificial Intelligence algorithms, that are trained on a normal pattern of life of that endpoint computing device with that host endpoint agent 101A-B. The network module may also reference one or more AI/machine learning models, using machine learning and AI algorithms, that are trained on a normal pattern of life of the network.

A researcher module (or a comparator module) may compare the received data on the network and/or the endpoint devices 101A-B to the normal pattern of life for these individual entities and others in the wider network context in order to detect anomalies and any future potential cyber threats. Note that, once the normal pattern of life has been learned by the models, the network module, the endpoint agent coordinator module, and/or the researcher module may readily identify the anomalies in the normal pattern of life and thus any unusual behaviors from the devices, users, or other aspects of the network and its associated host/endpoint computing devices. Also note that, once the normal pattern of life has been learned by the models, any other modules may be configured to cooperate together to readily identify the anomalies in the normal pattern of life and thus any unusual behaviors from the devices, users, or processes of the network and so on.

The coordinator module may analyze and integrate both activities occurring in the network as well as activities occurring internally within each end-point computing-device at the same time when analyzing the detected anomalies in the normal pattern of life in order to detect the cyber threat. For example, each host endpoint agent may provide pattern of life data to the cyber defense appliance so it may derive pattern of life for each end-point computing-device.

The graphical user interface may display metrics, alerts, and events of both the network in light of activities occurring in endpoint computing device on a common display screen. The graphical user interface allows a viewer to visually contextualize the metrics, alerts, and/or events occurring in the network in light of the activities occurring in the end-point computing-devices on the common display screen. The graphical user interface also allows a viewer to then to confirm the detected cyber threat in view of what is happening in the network as well as in the endpoint computing devices.

The cyber threat module may compare one or more of the detected anomalies by referencing one or more machine learning models trained on, at least, the cyber threat. Multiple AI/machine learning models may be trained, each model trained on a category of cyber threats and its corresponding members or each model trained on its own specific cyber threat. The cyber threat module cooperates and communicates with the other modules.

The cyber security appliance 120 may supplement the data provided to the users and cyber professionals using a researcher module. The researcher module may use one or more artificial intelligence algorithms to assess whether the anomalous activity has previously appeared in other published threat research or known lists of malicious files or Internet addresses. The researcher module may consult internal threat databases or external public sources of threat data. The researcher module may collect an outside data set describing at least one of an action or a state related to the cyber threat present outside of the network from at least one data source outside the network.

The cyber security appliance 120 may then take actions in response to counter detected potential cyber threats. The autonomous response module, rather than a human taking an action, may be configured to cause one or more rapid autonomous actions in response to be taken to counter the cyber threat. In some embodiments, the user interface for the response module may program the autonomous response module (i) to merely make a suggested response to take to counter the cyber threat that will be presented a display screen and/or sent by a notice to an administrator for explicit authorization when the cyber threat is detected; and/or (ii) to autonomously take a response to counter the cyber threat without a need for a human to approve the response when the cyber threat is detected. The autonomous response module may then send a notice of the autonomous response as well as display the autonomous response taken on the display screen.

The cyber threat module may cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

It should be understood that the cyber security appliance 120 may be hosted on any type and number of computing devices, servers, etc., and/or may be configured as its own cyber threat appliance platform, without limitations.

Figure 5:
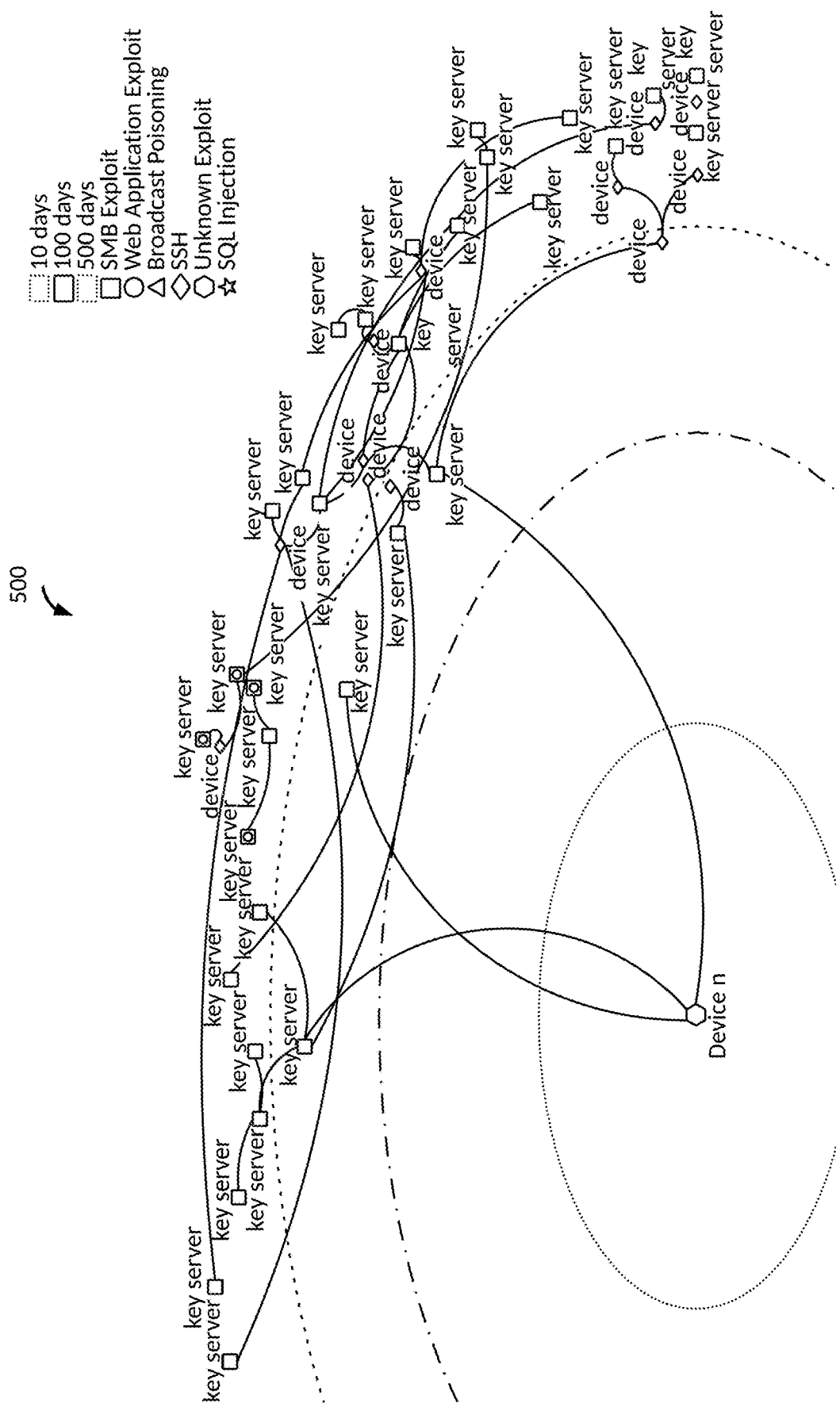
FIG. 5 illustrates an exemplary graph of a generated example of a pentested network in an email/network defense system used to illustrate multiple vulnerabilities of a payload of a customized phishing email being activated by a specific device and spreading in the pentested network, in accordance with an embodiment of the disclosure.

Referring now to FIG. 5, an exemplary graph 500 of a generated example of a pentested network in an email/network defense system used to illustrate multiple vulnerabilities of a payload of a customized phishing email being activated by a specific device and spreading in the pentested network is shown, in accordance with an embodiment of the disclosure. For example, the graph 500 may be used to illustrate a simulated attack generated and customized by the AI adversary red team in conjunction with trained AI models cooperating with AI classifiers in producing a list of specific organization-based classifiers for those AI classifiers.

As shown in FIG. 5, initially, the phishing email generator may generate a customized phishing email to specifically pentest both the email and network defense systems. The customized phishing emails may then be used to initiate a specific attack on a specific user that activates the spoofed payload and thus executes on a device "n" (as shown with the focal and initial "Device n" in FIG. 5) in the organization. As noted, the payload module may be configured to cooperate with the phishing email module to generate that payload (e.g., a second payload) attached to that customized phishing email for that specific attack on that specific user, where the attached payload is configured as a executable payload used to simulate how vulnerable that device "n" and its connected entities are in that defense system. Continuing with the above example, a training module may be configured to cooperate with the payload module to train the one or more specifically attacked users in the organization that activated the first payload attached to the one or more customized phishing emails, however the simulated cyber-attack module uses the second payload attached to that phishing email to pentest all the entities in the network defense system, as shown with the compromised entities in the graph 500. In addition, the simulated cyber-attack module may be used to generate the graph 500 with the cooperation of the trained AI models to deploy that specific attack depicted with the graph 500 in light of the orchestration module, where the specific attack generated by the specific attack scenario may be particularly customized based on email and network connectivity and behavior pattern data of one or more users in the cyber threat defense system as well as the contextual knowledge of the organization and its entities.

In some embodiments, the communications module of the AI adversary red team may be configured to cooperate with the analyzer module and communicate with the profile manager via one or more APIs hosted by the cyber security appliance. As described above, the profile manager module may be used to capture the graph 500, as the profile manager module is configured to maintain all of the profile tags on all of the devices and entities of the organization connecting to that depicted network under analysis. Furthermore, the network module may be used to capture the graph 500, as the network module is particularly used to cooperate with one or more network probes ingesting traffic data of, for example, the depicted network entities, devices, paths, and so on in the depicted network defense system. For example, the AI adversary red team simulator may use the network module cooperating with the email module to cooperate with the profile manager module to maintain the particular profile tags on each of those entities, devices, paths, etc., depicted in FIG. 5. That is, those particular profile tags may be maintained based on their behavior pattern data observed by using the ingested data from the email and/or network modules in conjunction with the trained AI models modeling the normal pattern of life for those entities, devices, paths, etc., depicted in that network defense system in order to obtain those depicted network connectivity and behavioral knowledge and patterns about each of those specific entities, devices, paths, etc., shown with the exemplary graph 500 in FIG. 5.

In other embodiments, the graph 500 may be used to generate an example of that network under analysis used to depict how vulnerable that system in that organization is in regard to the simulated attack being simulated in the simulated cyber-attack scenario module on connections between the depicted entities and devices connected to that initially compromised device "n" in that network. As such, the AI adversary red team simulator may be configured to create the graph of the virtualized network, with its nets and subnets. Each device connecting to the virtualized network is represented as a node in the graph. Two or more of the devices connecting to the virtualized network are assigned with different weighting resistances to malicious compromise from the cyber threat being simulated each of the cyber-attack scenarios during the simulation. As discussed later, some devices will be easier to compromise, and some will be harder to compromise.

For example, the exemplary constructed graph 500 of FIG. 5 may be of a virtualized instance of a network including: i) devices connecting to the virtualized instance of the network as well as ii) connections and pathways through the virtualized starting from a source (reduced to a portion of the graph due to size restrictions of this drawing). The source device 'n' is initially compromised by a cyber threat and the end results of a spread of the compromise in a simulation of an example cyber-attack scenario. The dotted circular lines going out from the source device 'n' represent bands of time, such as a number of days e.g., 10 days, 100 days, etc., before various devices on the network will likely be compromised by a given cyber threat in the example cyber-attack scenario. The AI adversary red team constructs a graph for all devices on each of the subnets in the network that source device 'n' may possibly connect to or get to.

In this example, the AI adversary red team starts off with an assumption that all systems are vulnerable and for each hop in the network, the algorithm seeks the path of least resistance to get closer to the end goal of the cyber-attack scenario while factoring in profile tags of users and devices, restricted subnets, and other defence mechanisms, such as firewalls, antivirus programs based on matching known virus signatures cooperating with the cyber security appliance (e.g., the cyber security appliance 120 in FIG. 1), etc., are used to make corresponding devices less vulnerable to compromise from the cyber threat. All paths may be considered by the AI adversary red team (even an unknown exploit or social engineering exploit that shouldn't be a possible pathway through the network) and then the quickest is sought, rather than searching for known vulnerabilities in the whole network and then plotting a course.

Note that, in some embodiments, an end goal algorithm may be triggered to back track a number of compromised devices to calculate a time duration to taking alternative pathways when the last 'x' number of hops through compromised devices does not significantly get the spread of the cyber-attack closer to achieving the end goal of that cyber-attack scenario. The AI adversary red team may be configured to search and query i) ingested network traffic data as well as ii) analysis on that network traffic data from a data store, from one or more modules, and from one or more AI models within the cyber security appliance. The AI adversary red team has access to and obtains a wealth of actual network data from the network under analysis from, for example, the data store, modules, and the AI models of normal pattern of life for entities in the network under analysis, which means thousands of paths of least resistance through possible routes in this network may be computed during the simulation even when one or more of those possible routes of least resistance that are not previously known or that have not been identified by a human before to determine a spread of the cyber threat from device-to-device.

For example, the network module of the cyber threat defence appliance already maintains a map of historic connectivity between all devices in the network in order to detect 'new' connections as well as model the normal traffic patterns from components connecting to the network, so the AI adversary red team may use this as a map of all possible routes to hop to. The AI adversary red team looks at all known devices that device 'n' has connected to, and the ports and other connection pathways each of these devices used to send traffic or otherwise communicate with each other and devices external to the network, and then calculates the weighting of how difficult it would be to infect/compromise each device. Note the difficulty to compromise a device may be a representation of time taken to infect/compromise a device with the cyber-attack. Difficulty may be calculated based upon the assigned profile tag of the target device. That is, the device with a profile tag of, for example, Windows XP or LLMNR with a human user would have a weighting of 1 (easiest) to transmit to. Note, those devices with profile tags of an anti-virus user or technical user tags would get a slight defence boost which reduces their weighting meaning a longer time to compromise this device.

The AI adversary red team may also look at other factors. The AI adversary red team also identifies recent credentials seen on device 'n' and looks for their use on other devices (as attackers dump credentials from memory on infected devices). The AI adversary red team may take in manual input on restricted subnets and other factors from the user interface window presented to the user. However, as discussed before, by having access to a wealth of network data from the data store and other components inside that the cyber security appliance, then the AI adversary red team may impliedly figure out restricted subnets for each device on the network and pathways unknown to human cyber professionals operating this network. For example, when the historic records show that the device 'n' has never accessed any device in a given subnet, then it is likely device 'n' is restricted from having access to that given subnet. In addition, a likelihood of the compromise of a virtual device being simulated may be tailored and accurate to the corresponding actual device being simulated because the cyber-attack scenario is based upon security credentials and behaviour characteristics from actual traffic data fed to the modules, data store, and AI models of the AI adversary red team (in addition to the cyber security appliance in some embodiments).

Again, some similar concepts and AI training from the mathematical modeling of infectious disease spreading may be applied to cyber threats such as software viruses, malware, insider data theft, and other forms of malicious cyber threats spreading and attacking entities on a network, including key servers. The AI adversary red team may be configured to determine how likely a cyber-attack may spread in a determined amount of time, such as hours, days, etc., to successfully infect/compromise 1) all components, 2) a maximum number of components within a given time duration, 3) 'x' number of key servers, 4) or other end goal selected by default or set by the user on the network. The AI adversary red team may model the spread of a cyber-attack by drawing a graph of a devices connected a subnet and each subnet making up a network and then weighting the graph based upon how likely it would be for the cyber-attack to spread. Also, the AI adversary red team may be configured to determine how severe it is when a particular component that the malicious cyber threats spread to, is infected.

The AI adversary red team may be configured to use these AI models initially trained on spread of the disease (e.g., the spread of the activated payload attached to the customized phishing email in the email and network defense systems), which are then retrained on the spread of malicious cyber threats through different devices on a network. Machine learning can repurpose graph theory analysis from other applications such as epidemiology to the lateral movement of an attacker through a network. The re-training combines i) knowledge of cyber threats, ii) knowledge of 1) security features and credentials, and 2) characteristics of network devices, and iii) other network specific information, such as information technology network information, email network information, SaaS environment information, Cloud information, etc., and iii) previous concepts and training from the mathematical AI modeling of infectious diseases to analyse network systems (e.g., email, IT network, SaaS, cloud, industrial networks, etc.) under analysis and make targeted predictions as well as provide validation of theoretical scenarios and attacks via the one or more modules of the AI adversary red team, which is then depicted as a simulated and detailed graph (such as the graph 500) and then provided to the organization as a detailed generated and formatted report.

In other examples, one or more modules may be configured to search and query: generally all of, but at least two or more of i) data stores (e.g., public OS data, ingested data observed by any cyber security appliances, and so on), ii) other modules, and iii) one or more AI models and classifiers making up such AI red team simulator used to pentest and then train and identify any vulnerabilities of the actual network under analysis from any actual cyber threats, based on what those searched and queried data stores, other modules/appliances/probes, etc., and AI models already know about that network and those entities under analysis to generate the simulated graph. For example, the graph of the virtualize instance of the network may be created with generally all of, but at least two or more of: 1) known characteristics of the network itself, 2) pathway connections between devices on that network, 3) security features and credentials of devices and/or their associated users, and 4) behavioural characteristics of the devices and/or their associated users connecting to that network, which all of this information is obtained from what was already know about the network from the AI adversary red team, the cyber security appliance, and/or any other similar devices.

In one example, the AI adversary red team may be configured to create the actual version of that network and its network devices based on the organization's user input to make sure that no major entities are degraded or compromised in that actual network under analysis when running the simulation (e.g., a vulnerability test). The network, and its network components connecting to that network, being tested during the simulation may thus be up to date and accurate for a time the actual network under analysis is being tested and simulated because the AI adversary red team is configured to obtain actual network data collected by its one or more cooperating modules (as described above). The AI adversary red team may be configured to simulate the compromise of a spread of the cyber threat being simulated in the simulated cyber-attack scenario on connections between the devices connected to the network. During this, the AI adversary red team may be configured to then perform one or more calculations on an ease of transmission of the cyber threat between those devices, including key network devices, on a hop between those devices.

Lastly, as noted above, the AI adversary red team may be configured to construct the graph of the simulated version of the attack on that actual network from collected data and knowledge known and stored by the respective modules, data stores, and AI models and classifiers. Note that the knowledge known and stored by the email and network modules may be obtained at least from the ingested traffic from the email and/or network probes in the actual network under analysis. This information may be needed when the AI adversary red team is configured to create one or more scenarios for specific attacks using, for example, one or more models of one or more hypothetical compromises by the hypothetical cyber threat through one or more virtualized versions of that network based upon how likely it would be for such cyber-attacks to spread to achieve either of: (1) a programmable end goal of that cyber-attack scenario set by a user, and/or (2) a programmable end goal of that cyber-attack scenario set by one or more default end goals scripted into such cyber-attack scenarios, such as an end goal of compromising the most amount of possible entities in that defense system used for that organization. In an embodiment, a source device, such as the device "n", may be the initial carrier of the compromise/activation (e.g., unwanted and/or unauthorized access by a malicious payload and/or the like) that will spread down the path of least resistance in the network to achieve a purpose of that cyber-attack, which, by default, is to compromise the greatest number of possible entities in that network of that system for that organization. Other cyber-attack scenarios may have an end goal to target specific devices associated with compromising specific users, such as finance or human resources, and/or compromising specific key servers deep within the network behind multiple layers of network security, and in both cases may not want to compromise as many devices as possible but compromise limited devices in a pathway to the target goal of the cyber-attack scenario in order to avoid accidental detection before reaching the specific target of the attack scenario.

Figure 6:
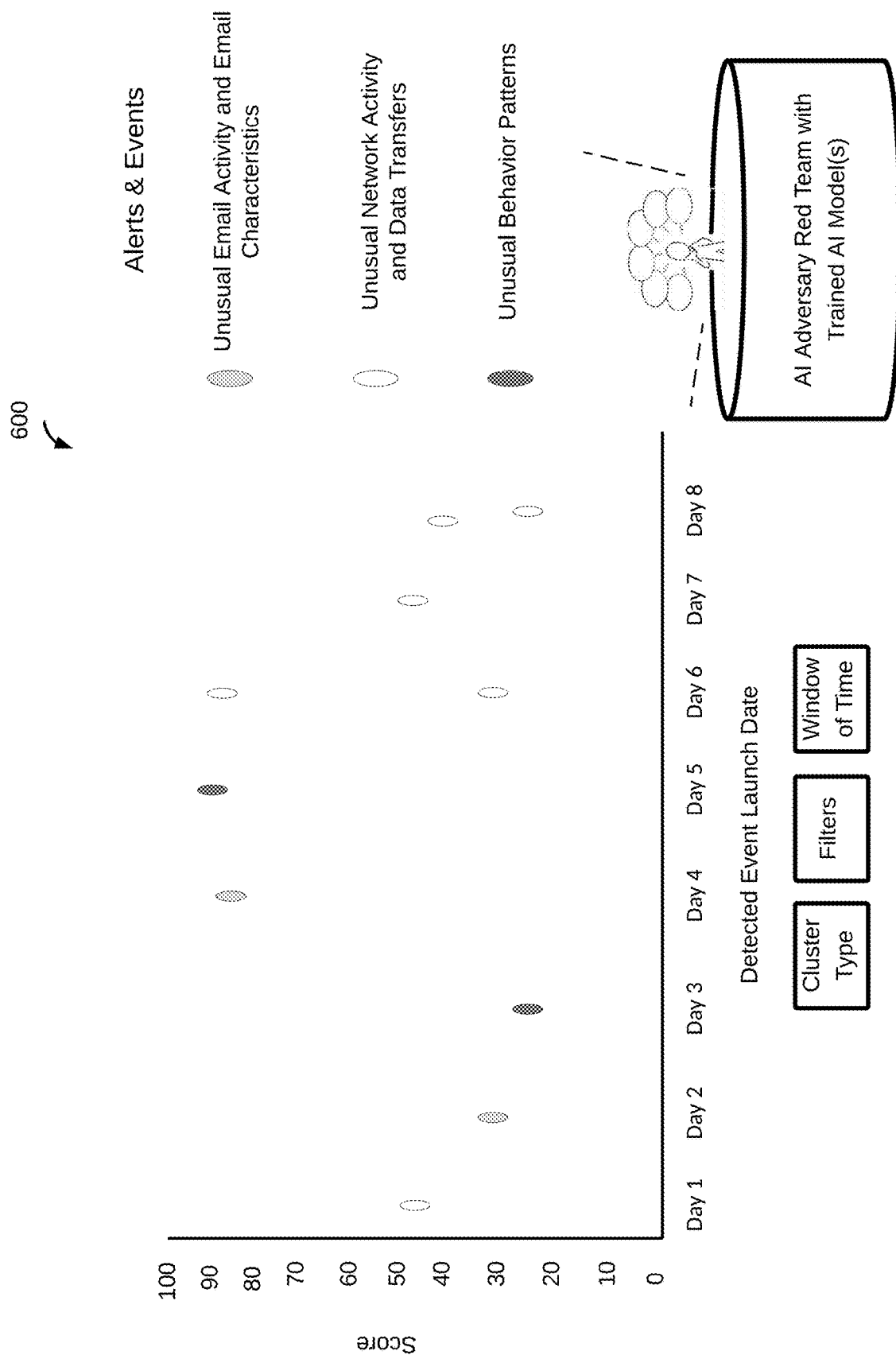
FIG. 6 illustrates a block diagram of a graph depicting one or more events and alerts triggered by any detected unusual email and network connectivity and behaviour patterns, in accordance with an embodiment of the disclosure.

Referring now to FIG. 6, an exemplary graph 600 for depicting events and alerts triggered by various detected unusual email and network connectivity and behaviour pattern data in relation to their cyber-threat scores and detected event launch times is shown, in accordance with an embodiment of the disclosure. The graph 600 may depict a cluster of unusual behaviors detected and analyzed in an AI cyber security platform, where the cluster of detected unusual behaviors may include, but are not limited to, any detected unusual payload activations based on any email and network activity and/or data transfers as well as any other unusual behavior patterns. For example, the graph 600 may depict one or more different machine learning models (as described above) that are trained to analyze any detected unusual behavior patterns from the collected pattern of life data against the normal pattern of life from any collected data from any of the entities in the organization. For example, the AI adversary red team may use its analyzer module and cooperating modules to ingest all (or some) of this data to create various automated phishing emails and attack scenarios for any specific entities and/or users of that organization, where all of the detected and analyzed email/network activity and behavior pattern data may be particularly used to customize those phishing emails for that organization.

In some embodiments, the graph 600 may be provided as a user interface used to show a user the cluster of alerts and/or events associated with the variety of detected unusual email/network activity, data transfers, and behavior patterns, which may further include the respective detailed labels of the characteristics of such detected alerts and/or events. Note that, in these embodiments, the AI adversary red team may utilize any of the AI models described above for any of its trained contextual knowledge of the organization which includes language-based data, email and network connectivity and behavior pattern data, and historic knowledgebase data.

In other examples, a behavioural pattern analysis of what are the unusual behaviours of the email/network/system/device/user under analysis by the machine learning models may be as follows. The cyber defence system uses unusual behaviour deviating from the normal behaviour and then builds a sequence of unusual behaviour and the causal links between that sequence of unusual behaviour to detect cyber threats as shown with the graph 600 in FIG. 6. In additional embodiments, the unusual patterns may be determined by filtering out what activities/events/alerts that fall within the window of what is the normal pattern of life for that network/system/device/user under analysis, and then the pattern of the behaviour of the activities/events/alerts that are left, after the filtering, can be analysed to determine whether that pattern is indicative of a behaviour of a malicious actor—human, program, or other threat. Next, the cyber defence system can go back and pull in some of the filtered out normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defence system is configurable in a user interface, by a user, enabling what type of automatic response actions, if any, the cyber defence system may take when different types of cyber threats, indicated by the pattern of behaviours under analysis, that are equal to or above a configurable level of threat posed by this malicious actor.

The AI models may perform by the threat detection through a probabilistic change in a normal behaviour through the application of an unsupervised Bayesian mathematical model to detect behavioural change in computers and computer networks. The core threat detection system is termed the 'Bayesian probabilistic'. The BP approach can determine periodicity in multiple time series data and identify changes across single and multiple time series data for the purpose of anomalous behaviour detection. From the email and potentially IT network raw sources of data, a large number of metrics can be derived each producing time series data for the given metric.

The detectors in the analyser module including its network module (simulator can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analysing various aspects of the emails, iii) coming from specific devices and/or users within a system, etc. At its core, the AI adversary red team as well as the cyber security appliance may mathematically characterize what constitutes 'normal' behaviour in line with the normal pattern of life for that entity and organization based on the analysis of a large number/set of different measures of a device's network behaviour. Such red team and appliance can build a sophisticated 'pattern of life'—that understands what represents normality for every person, device, entity, email activity, and network activity in the system being protected by the cyber threat defense system. For example, the analyzer module may rank supported candidate cyber threat hypotheses by a combo of likelihood that this candidate cyber threat hypothesis is supported and a severity threat level of this incident type.

In addition, the correlation of the reporting and formatting modules may be configured to generate the report (or the graphs) with the identified critical devices connecting to the virtualized instance of the network under analysis that should have the priority to allocate security resources to them, along with one or more portions of the constructed graph. The formatting module may have an autonomous email-report composer that cooperates with the various AI models and modules of the AI adversary red team as well as at least a set of one or more libraries of sets of contextual text, objects, and visual representations to populate on templates of pages in the email threat report based on any of the training and/or simulated attacking scenarios observed. The autonomous email-report composer can compose an email threat report on cyber threats that is composed in a human-readable format with natural language prose, terminology, and level of detail on the cyber threats aimed at a target audience being able to understand the terminology and the detail. Such modules and AI models may cooperate with the autonomous email-report composer to indicate in the email threat report, for example, an email attack's purpose and/or targeted group (such as members of the finance team, or high-level employees).

The formatting module may format, present a rank for, and output the current email threat report, from a template of a plurality of report templates, that is outputted for a human user's consumption in a medium of, any of 1) a printable report, 2) presented digitally on a user interface, 3) in a machine readable format for further use in machine-learning reinforcement and refinement, and 4) any combination of the three. The system may use at least three separate machine learning models or any particular number of separate AI machine learning models. For example, a machine learning model may be trained on specific aspects of the normal pattern of life for entities in the system, such as devices, users, email/network traffic flow, outputs from one or more cyber security analysis tools analysing the system, etc. One or more machine learning models may also be trained on characteristics and aspects of all manner of types of cyber threats. One or more machine learning models may also be trained on composing email threat reports.

The various modules cooperate with each other, the AI models, and the data store to carry out the operations discussed above with regard to the AI adversary red team. Such modules may cooperate to improve the analysis of the how vulnerable the organization is based on any of the observed (or trained/simulated/pentested) unusual events are to that specific organization and thus improve the formalized report generation with specific vulnerabilities and the extend of those vulnerabilities with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report. Note that, one or more processing units are configured to execute software instructions associated with the AI adversary red team and any of its cooperating modules in that depicted system. Also note, that one or more non-transitory storage mediums are configured to store at least software associated with the AI adversary red team simulator/apparatus, the other modules, and the AI models and classifiers.

Figure 7:
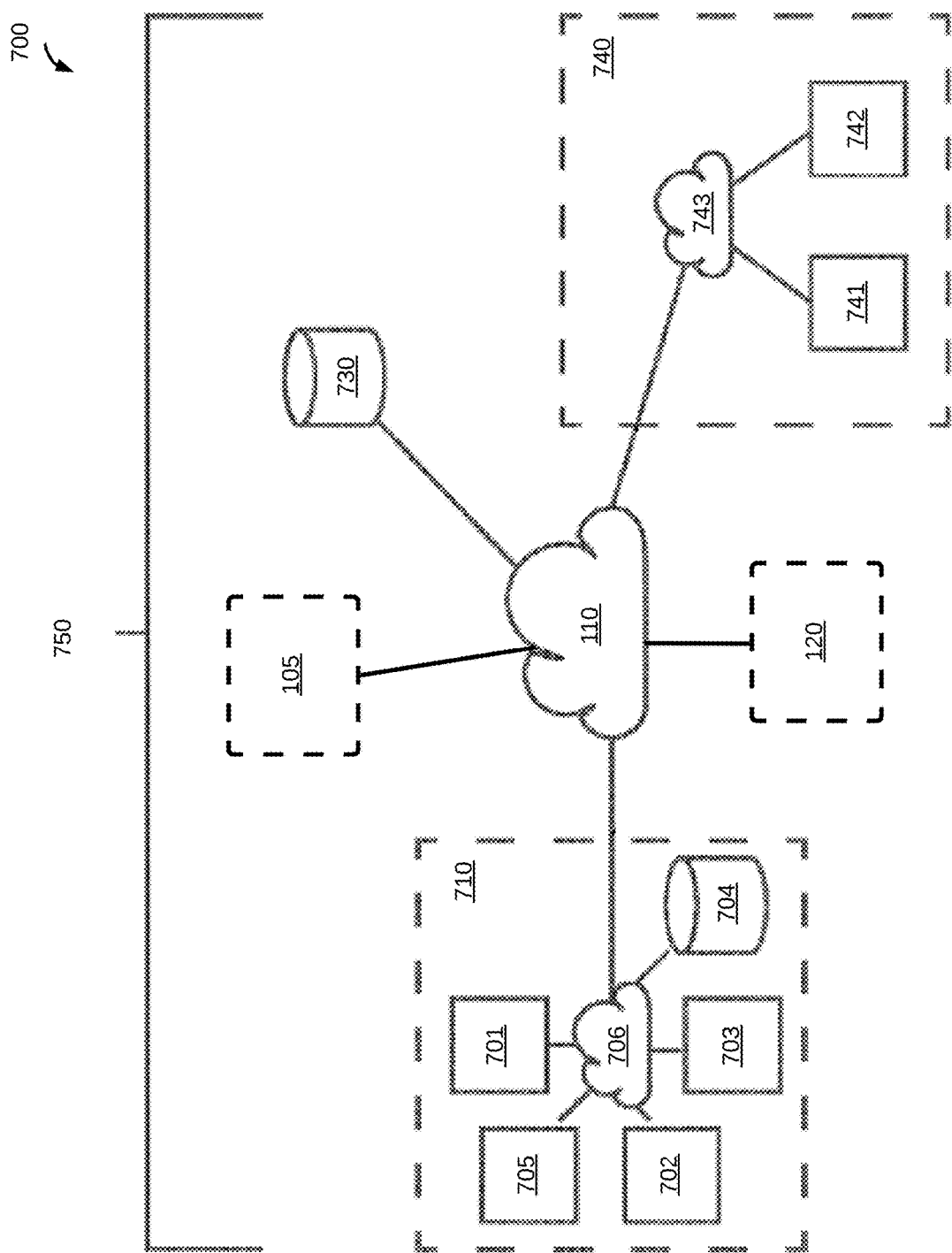
FIG. 7 illustrates a block diagram of an exemplary AI cyber security system having an AI adversary red team used to pentest and train one or more computer systems connected to a network, in accordance with an embodiment of the disclosure.

Referring now to FIG. 7, an exemplary AI cyber threat defense system 700 having the AI adversary red team 105 and a cyber threat security appliance 120 protecting a network 110, a database server 730, and one or more computing devices 710 and 740 is shown, in accordance with an embodiment of the disclosure. The AI cyber threat defense system 700 depicted in FIG. 7 may be similar to the AI cyber security systems 100 and 200 depicted above in FIGS. 1-2. For example, the AI cyber threat defense system 700 may configure the AI adversary red team 105 (and/or the cyber security appliance 120) to pentest the computing devices 710 and 740 communicatively coupled over the network 110.

As shown in FIG. 7, the cyber threat defense system 700 may include a network of computer systems 750 that may be using the AI adversary red team 105 as well as the cyber security appliance 120. The exemplary system 700 depicted by FIG. 7 may be a simplified illustration, which is provided for ease of explanation of the present disclosure. For example, the network of computer systems 750 may comprise a first computer system 710 within a building, which uses the cyber threat detection system 700 to detect and thereby attempt to prevent threats to computing devices within its bounds. The first computer system 710 may comprise one or more computers 701-703, a local server 704, and a multifunctional device 705 that may provide printing and facsimile functionalities to each of the respective computers 701-703. All of the devices within the first computer system 710 may be communicatively coupled via a first network 706, such as a Local Area Network (LAN) and/or the like. Consequently, all of the computers 701-703 may be able to access the local server 704 via the network 706 and use the functionalities of the multifunctional device 705 via the network 706.

Moreover, the network 706 of the first computer system 710 may be communicatively coupled to the network 110 (e.g., the Internet), which may in turn provide the computers 701-703 with access to a multitude of other computing devices including the database server 730 and the second computer system 740. For example, the second computer system 740 may also include one or more computers 741-742 that may be communicatively coupled to each other via a second network 743 (or a second LAN).

In this exemplary embodiment, the computer 701 on the first computer system 710 may be configured by an AI cyber threat security detection system, such as the system 700 and any of the other AI based systems 100 and 200 depicted above, and therefore runs the necessary AI based threat detection processes for pentesting various attacks on the first computer system 710 for training and/or detecting vulnerabilities in that system 710. Additionally, As such, it comprises a processor arranged to run the steps of the processes described herein, memory required to store information related to the running of such processes, as well as a network interface for collecting the required information and so on. This process shall now be described in greater detail below with reference to FIG. 7.

The computer 701 may build and maintain a dynamic, ever-changing model of the 'normal behavior' of each user and machine within the system 710. The approach is based on Bayesian mathematics, and monitors all interactions, events and communications within the system 710—which computer is talking to which, files that have been created, networks that are being accessed, and so on.

For example, the computer 702 may be based in a company's San Francisco office and operated by a marketing employee who regularly accesses the marketing network, usually communicates with machines in the company's U.K. office in second computer system 740 between 9:30 AM and midday and is active from about 8:30 AM until 6 PM. The same employee virtually never accesses the employee time sheets, very rarely connects to the company's Atlanta network and has no dealings in South-East Asia. The AI based cyber threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The AI adversary red team apparatus/simulator may be built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles may be stolen so infrequently that they do not impact machine performance. But however cloaked and sophisticated the attack is, there will always be a measurable delta, even if extremely slight, in typical machine behavior, between pre and post compromise. This behavioral delta may be observed and acted on with the form of Bayesian mathematical analysis used by the AI based cyber threat security detection system installed on the computer 701.

The AI based cyber threat security/defense self-learning platform may use machine-learning technology with the AI adversary red team. The machine-learning technology, using advanced mathematics, may detect previously unidentified threats, without rules, and automatically defend networks. Note, today's attacks may be of such severity and speed that a human response may not happen quickly enough. Thanks to these self-learning advances, it is now possible for a machine to uncover emerging threats and deploy appropriate, real-time responses to fight back against the most serious cyber threats.

This AI cyber security system with the AI adversary red team may therefore be built and trained to have a sophisticated 'pattern of life'—that understands what represents normality for every person, device, and network activity associated with any of the users and/or entities in such system being protected by such AI cyber threat security system.

The AI cyber security system with the AI adversary red team may have the ability to self-learn and detect normality in order to spot true anomalies, allowing organizations of all sizes to understand any unusual behaviors of users, machines, tokens (or symbols, process chains, etc.), and so on, observed within any respective and discrete host device(s) and network(s) at both an individual and group level. Monitoring behaviors, rather than using predefined descriptive objects and/or signatures, means that more attacks may be spotted ahead of time and extremely subtle indicators of wrongdoing may be detected. Unlike traditional legacy defenses, a specific attack type or new malware does not have to have been seen first before it may be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This AI cyber security system with the AI adversary red team may thus be capable of making value judgments and carrying out higher value, more thoughtful tasks. Machine learning requires complex algorithms to be devised and an overarching framework to interpret the results produced. However, when applied correctly these approaches may facilitate machines to make logical, probability-based decisions and undertake thoughtful tasks.

Advanced machine-learning is at the forefront of the fight against automated and human-driven cyber-threats, overcoming the limitations of rules and signature-based approaches: (i) The machine-learning learns what is normal within a network—it does not depend upon knowledge of previous attacks. (ii) The machine-learning thrives on the scale, complexity and diversity of modern businesses, where every device and person is slightly different. (iii) The machine-learning turns the innovation of attackers against them—any unusual activity is visible. (iv) The machine-learning constantly revisits assumptions about behavior, using probabilistic mathematics. (v) The machine-learning is always up to date and not reliant on human input.

Utilizing machine-learning in cyber security technology is difficult, but when correctly implemented it is extremely powerful. The machine-learning means that previously unidentified threats may be detected, even when their manifestations fail to trigger any rule set or signature. Instead, machine-learning allows the system to analyze large sets of data and learn a 'pattern of life' for what it sees. Machine learning may approximate some human capabilities to machines, such as: (i) thought: it uses past information and insights to form its judgments; (ii) real time: the system processes information as it goes; and (iii) self-improving: the model's machine-learning understanding is constantly being challenged and adapted, based on new information. New unsupervised machine-learning therefore allows computers to recognize evolving threats, without prior warning or supervision.

Note that, in other embodiments, one or more other detectors and data analysis process may be employed as detailed below, without limitations.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but may independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative: (i) Threats from within, which would otherwise go undetected, may be spotted, highlighted, contextually prioritized and isolated using these algorithms. (ii) The application of machine learning has the potential to provide total network visibility and far greater detection levels, ensuring that networks have an internal defense mechanism. (iii) Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include at least one or more of: server access; data access; timings of events; credential use; DNS requests; and/or any other similar parameters. Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices. At a glance, clustering: (i) Analyzes behavior in the context of other similar devices on the network; (ii) Algorithms identify naturally occurring groupings of devices—impossible to do manually; and (iii) Simultaneously runs a number of different clustering methods to inform the models.

Network Topology

Any cyber threat detection system must also recognize that a network is far more than the sum of its individual parts, with much of its meaning contained in the relationships among its different entities, and that complex threats may often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output may contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that may be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks may be spotted against the background understanding of what represents normality within a network. No pre-definitions are needed, which allows for the best possible insight and defense against today's threats. On top of the detection capability, the cyber threat defense system may create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology may become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within. As such, the threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output may contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices may communicate with each other in a network environment. The network environment has a communications network. The network may include one or more networks selected from an optical network, a cellular network, the Internet, a Local Area Network ("LAN"), a Wide Area Network ("WAN"), a satellite network, a 3$^{rd}$ party 'cloud' environment; a fiber network, a cable network, and combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system may communicate with the server(s). The client computing system may include, for example, the software application or the hardware-based system in which the client computing system may be able to exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud user's cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be configured to utilize a protocol, such as Hypertext Transfer Protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access is configured to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system may include a server engine, a web page management component, a content management component, and a database management component. The server engine may perform basic processing and operating-system level tasks. The web page management component may handle creation and display, or routing of web pages or screens associated with receiving and providing digital content and digital advertisements. Users (e.g., cloud users) may access one or more of the server computing systems by means of a Uniform Resource Locator ("URL") associated therewith. The content management component may handle most of the functions in the embodiments described herein. The database management component may include storage and retrieval tasks with respect to the database, queries to the database, and storage of data.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any Hypertext Markup Language ("HTML") or Wireless Access Protocol ("WAP") enabled client computing system (e.g., the client computing system 702B) or any equivalent thereof. The client computing system may host a browser and/or a specific application to interact with the server computing system. Each application has a code scripted to perform the functions that the software component is configured to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

Computing Systems

A computing system may be, wholly or partially, part of one or more of the server or client computing devices in accordance with some embodiments. Components of the computing system may include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media may be any available media that may be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which may be used to store the desired information, and which may be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM may include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone may cooperate with speech recognition software. These and other input devices are often connected to the processing unit through a user input interface that is coupled to the system bus, but may be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system may operate in a networked environment using logical connections to one or more remote computers/client devices, such as a remote computing system. The logical connections may include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design may be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as Python, C, C++, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components may be duplicated by software emulation. Thus, a software program written to accomplish those same functions may emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
   an artificial intelligence (AI) adversary red team simulator configured to pentest one or more defenses implemented by a cyber threat defense system, wherein the one or more defenses include at least one or more of an email defense system and a network defense system used to protect an organization and one or more entities of the organization in the cyber threat defense system;
   one or more AI models trained with machine learning on contextual knowledge of the organization and the one or more entities of the organization, the one or more trained AI models are configured to identify data points from the contextual knowledge of the organization and its entities, wherein the contextual knowledge includes language-based data, email and network connectivity and behavior pattern data, and historic knowledgebase data, and wherein the one or more trained AI models are configured to cooperate with an AI classifier in the AI adversary red team simulator by producing a list of specific organization-based classifiers for the AI classifier;
   a phishing email generator in the AI adversary red team simulator, the phishing email generator configured to generate one or more automated phishing emails to pentest the email defense system, wherein the phishing email generator is configured to cooperate with the one or more trained AI models to customize the one or more automated phishing emails based on the identified data points of the organization and its entities, and wherein the one or more customized phishing emails are used to then at least initiate one or more specific attacks on one or more specific users associated with the one or more entities of the organization, and
   a paraphrasing engine in the phishing email generator, the paraphrasing engine configured to receive email data from the one or more identified data points, and to then break up the received email data into two or more segments of an email, wherein the two or more segments of the email include at least two or more of a subject line, a body content, and a signature line, and wherein the paraphrasing engine is further configured to rephrase the received email data so that one or more particular segments of a first phishing email from the one or more customized phishing emails is different from one or more particular segments of a second phishing email from the one or more customized phishing emails.

2. The apparatus of claim 1, further comprising:
   a payload module is configured to cooperate with the phishing email generator to generate at least one or more of a first payload and a second payload attached to the one or more customized phishing emails, wherein the first payload is configured as a non-executable payload, and the second payload is configured as a executable payload;
   a training module is configured to cooperate with the payload module to train the one or more specifically attacked users in the organization that activated the first payload attached to the one or more customized phishing emails; and
   a simulated cyber-attack module in the AI adversary red team simulator, the simulated cyber-attack module is configured to use the second payload attached to the one or more customized phishing emails to pentest the network defense system, wherein the simulated cyber-attack module is configured to cooperate with the one or more trained AI models to customize the one or more specific attacks in light of one or more specific attack scenarios in the network defense system.

3. The apparatus of claim 2, wherein the one or more specific attack scenarios are implemented by a scenario module in the AI adversary red team, wherein the scenario module is configured to cooperate with an orchestration module as well as the one or more trained AI models to generate the one or more specific attack scenarios, and wherein the one or more generated specific attack scenarios are particularly customized based on email and network connectivity and behavior pattern data of one or more users in the cyber threat defense system as well as the contextual knowledge of the organization and its entities.

4. An apparatus, comprising:
   an artificial intelligence (AI) adversary red team simulator configured to pentest one or more defenses implemented by a cyber threat defense system, wherein the one or more defenses include at least one or more of an email defense system and a network defense system used to protect an organization and one or more entities of the organization in the cyber threat defense system;
   one or more AI models trained with machine learning on contextual knowledge of the organization and the one or more entities of the organization, the one or more trained AI models are configured to identify data points from the contextual knowledge of the organization and its entities, wherein the contextual knowledge includes language-based data, email and network connectivity and behavior pattern data, and historic knowledgebase data, and wherein the one or more trained AI models are configured to cooperate with an AI classifier in the AI adversary red team simulator by producing a list of specific organization-based classifiers for the AI classifier;

a phishing email generator in the AI adversary red team simulator, the phishing email generator configured to generate one or more automated phishing emails to pentest the email defense system, wherein the phishing email generator is configured to cooperate with the one or more trained AI models to customize the one or more automated phishing emails based on the identified data points of the organization and its entities, and wherein the one or more customized phishing emails are used to then at least initiate one or more specific attacks on one or more specific users associated with the one or more entities of the organization;

an analyzer module in the AI adversary red team simulator, the analyzer module configured to cooperate with the AI classifier in producing the list of the specific organization-based classifiers for the AI classifier, wherein the analyzer module is configured to cooperate with the one or more trained AI models to identify a normal pattern of life for the one or more entities of the organization in at least one or more of the email and network defense systems;

a communications module in the AI adversary red team simulator, the communications module configured to cooperate with the analyzer module and communicate with an application programming interface (API) hosted by a cyber security appliance; and a profile manager module in the cyber security appliance, the profile manager module configured to communicate and cooperate with the AI adversary red team simulator, wherein the profile manager module is configured to maintain a profile tag on each entity of the organization connecting to a network under analysis based on its email and network connectivity and behavior pattern data, and wherein the profile manager module is configured to then supply the profile tag for those entities connecting to the network under analysis.

5. The apparatus of claim 4, further comprising:

a collections module in AI adversary red team simulator, the collections module configured to monitor and collect specific organization-based data from multiple software host processes executing on one or more host endpoint agents residing on one or more endpoint computing devices in the cyber threat defense system, wherein the communications module and the collections module cooperate to send all of the email and network connectivity and behavior pattern data to the cyber security appliance regarding the specific organization-based data monitored and collected from the one or more endpoint computing devices connecting to the network under analysis;

a network module in the AI adversary red team simulator, the network module configured to cooperate with one or more network probes ingesting traffic data for network entities, network devices, and network users in the network defense system; and an email module in the AI adversary red team simulator, the email module configured to cooperate with one or email probes for ingesting email traffic data for email entities, email devices, and email users in the email defense system, wherein the profile manager module is configured to maintain the profile tag on each of those entities, devices, and users based on their behavior pattern data observed by at least one or more of the email module and the network module in conjunction with the one or more trained AI models modelling the normal pattern of life for those entities, devices, and users in the email and network defense systems to obtain their email and network connectivity and behavioral knowledge about each specific user, device, and entity associated with that specific organization.

6. The apparatus of claim 5, wherein the collections module is configured to cooperate with the communication module as well as the analyzer module to gather external data from one or more open source databases specific to the organization, the entities of the organization, and the users associated with the organization and its entities, wherein the one or more open source databases include at least one or more of an online professional networking platform for organizations and users, an online website of an organization with pages of their industry groups, teams, and users, and an online public search database.

7. The apparatus of claim 6, wherein the list of specific organization-based classifiers includes a context classifier, a natural language classifier, a historic knowledgebase classifier, an open source classifier, an industry group classifier, a domain classifier, attack vector classifier, and/or a hierarchical relationship classifier, wherein the context classifier is used for text trained on a content for a body of an email for that organization, wherein the natural language classifier is used for text trained on a natural language for that organization, wherein the historic knowledgebase and open source classifiers are used for text trained on any historical information and publicly available information for that organization, wherein the industry group classifier is used for text trained on a particular industry group and its particular industry-based terminology for that organization, wherein the domain classifier is used for text trained on a variety of spoofing domains for that organization, wherein the attack vectors is used for text, objects, and visual representations trained on potential spoofing cyber threats for that organization, and wherein the hierarchical relationship classifier is used for text trained on automatically identifying a high-level/low-level employee structure based on all of the collected employee titles and roles for that organization.

8. The apparatus of claim 7, further comprising:

a cyber threat module configured in the AI adversary red team simulator and/or the cyber security appliance to reference one or more machine-learning models trained on potential cyber threats in conjunction with the one or more trained AI models as well as the AI classifier, wherein the cyber threat module is configured to cooperate with at least one or more of a payload module, a scenario module, and the simulated attack module to generate a specific attack scenarios executed in the cyber threat defense system based on the trained potential cyber threats identified by the cyber threat module.

9. The apparatus of claim 8, further comprising:

a user interface in the AI adversary red team simulator, the user interface configured to cooperate with an orchestration module to provide one or more user input parameters specifically tailored to the organization and specified by a particular user in the organization, wherein the orchestration module is configured to reside on at least one of the AI adversary red team simulator and the cyber security appliance; and wherein the one or more user input parameters include a first parameter configured to identify a predetermined attack to pentest the cyber threat defense system, a second parameter configured to select a predetermined user and entity to be attacked with the identified predetermined attack, a third parameter configured to establish a predetermined threshold to execute the identified predetermined attack on the selected predetermined user and entity, and a fourth parameter configured to restrict one or more predetermined users and entities in the organization from being attacked, wherein the predetermined threshold is configured based on at least one or more of a predetermined time schedule allowed for that attack, a predetermined maximum number of paths allowed for that attack, and a predetermined maximum number of compromised users, devices, and entities allowed for that attack.

10. A method for generating AI automated phishing emails to pentest a cyber threat defense system, comprising:
configuring an AI adversary red team simulator to pentest one or more defenses implemented by the cyber threat defense system, wherein the one or more defenses include at least one or more of an email defense system and a network defense system used to protect an organization and one or more entities of the organization in the cyber threat defense system;
training one or more AI models with machine learning on contextual knowledge of the organization and the one or more entities of the organization, the one or more trained AI models are configured to identify data points from the contextual knowledge of the organization and its entities, wherein the contextual knowledge includes language-based data, email and network connectivity and behavior pattern data, and historic knowledgebase data, and wherein the one or more trained AI models are configured to cooperate with an AI classifier in the AI adversary red team simulator by producing a list of specific organization-based classifiers for the AI classifier; and
configuring a phishing email generator in the AI adversary red team simulator to generate one or more automated phishing emails to pentest the email defense system, wherein the phishing email generator is configured to cooperate with the one or more trained AI models to customize the one or more automated phishing emails based on the identified data points of the organization and its entities, and wherein the one or more customized phishing emails are used to then at least initiate one or more specific attacks on one or more specific users associated with the one or more entities of the organization,
wherein one or more specific attack scenarios are implemented by a scenario module in the AI adversary red team, wherein the scenario module is configured to cooperate with an orchestration module as well as the one or more trained AI models to generate the one or more specific attack scenarios, and wherein the one or more generated specific attack scenarios are particularly customized based on email and network connectivity and behavior pattern data of one or more users in the cyber threat defense system as well as the contextual knowledge of the organization and its entities.

11. A method for generating AI automated phishing emails to pentest a cyber threat defense system, comprising:
configuring an AI adversary red team simulator to pentest one or more defenses implemented by the cyber threat defense system, wherein the one or more defenses include at least one or more of an email defense system and a network defense system used to protect an organization and one or more entities of the organization in the cyber threat defense system;
training one or more AI models with machine learning on contextual knowledge of the organization and the one or more entities of the organization, the one or more trained AI models are configured to identify data points from the contextual knowledge of the organization and its entities, wherein the contextual knowledge includes language-based data, email and network connectivity and behavior pattern data, and historic knowledgebase data, and wherein the one or more trained AI models are configured to cooperate with an AI classifier in the AI adversary red team simulator by producing a list of specific organization-based classifiers for the AI classifier;
configuring a phishing email generator in the AI adversary red team simulator to generate one or more automated phishing emails to pentest the email defense system, wherein the phishing email generator is configured to cooperate with the one or more trained AI models to customize the one or more automated phishing emails based on the identified data points of the organization and its entities, and wherein the one or more customized phishing emails are used to then at least initiate one or more specific attacks on one or more specific users associated with the one or more entities of the organization; and
configuring a paraphrasing engine in the phishing email generator to receive email data from the one or more identified data points, and to then break up the received email data into two or more segments of an email, wherein the two or more segments of the email include at least two or more of a subject line, a body content, and a signature line, and wherein the paraphrasing engine is further configured to rephrase the received email data so that one or more particular segments of a first phishing email from the one or more customized phishing emails is different from one or more particular segments of a second phishing email from the one or more customized phishing emails.

12. The method of claim 11, further comprising:
configuring a payload module to cooperate with the phishing email generator to generate at least one or more of a first payload and a second payload attached to the one or more customized phishing emails, wherein the first payload is configured as a non-executable payload, and the second payload is configured as an executable payload;
configuring a training module to cooperate with the payload module to train the one or more specifically attacked users in the organization that activated the first payload attached to the one or more customized phishing emails; and
configuring a simulated cyber-attack module in the AI adversary red team to use the second payload attached to the one or more customized phishing emails to pentest the network defense system, wherein the simulated cyber-attack module is configured to cooperate with the one or more trained AI models to customize the one or more specific attacks in light of one or more specific attack scenarios in the network defense system.

13. The method of claim 12, wherein the one or more specific attack scenarios are implemented by a scenario module in the AI adversary red team, wherein the scenario module is configured to cooperate with an orchestration module as well as the one or more trained AI models to generate the one or more specific attack scenarios, and wherein the one or more generated specific attack scenarios are particularly customized based on email and network connectivity and behavior pattern data of one or more users in the cyber threat defense system as well as the contextual knowledge of the organization and its entities.

14. The method of claim 10, further comprising:
configuring an analyzer module in the AI adversary red team simulator to cooperate with the AI classifier in producing the list of the specific organization-based classifiers for the AI classifier, wherein the analyzer module is configured to cooperate with the one or more trained AI models to identify a normal pattern of life for the one or more entities of the organization in at least one or more of the email and network defense systems;
configuring a communications module in the AI adversary red team simulator to cooperate with the analyzer module and communicate with an application programming interface (API) hosted by a cyber security appliance;
configuring a profile manager module in the cyber security appliance to communicate and cooperate with the AI adversary red team simulator, wherein the profile manager module is configured to maintain a profile tag on each entity of the organization connecting to a network under analysis based on its email and network connectivity and behavior pattern data, and wherein the profile manager module is configured to then supply the profile tag for those entities connecting to the network under analysis;
configuring a collections module in AI adversary red team simulator to monitor and collect specific organization-based data from multiple software processes executing on one or more host endpoint agents residing on one or more endpoint computing devices in the cyber threat defense system, wherein the communications module and the collections module cooperate to send all of the email and network connectivity and behavior pattern data to the cyber security appliance regarding the specific organization-based data monitored and collected from the one or more endpoint computing devices connecting to the network under analysis;
configuring a network module in the AI adversary red team simulator to cooperate with one or more network probes ingesting traffic data for network entities, network devices, and network users in the network defense system; and
configuring an email module in the AI adversary red team simulator to cooperate with one or email probes for ingesting email traffic data for email entities, email devices, and email users in the email defense system, wherein the profile manager module is configured to maintain the profile tag on each of those entities, devices, and users based on their behavior pattern data observed by at least one or more of the email module and the network module in conjunction with the one or more trained AI models modelling the normal pattern of life for those entities, devices, and users in the email and network defense systems to obtain their email and network connectivity and behavioral knowledge about each specific user, device, and entity associated with that specific organization.

15. The method of claim 14, wherein the collections module is configured to cooperate with the communication module as well as the analyzer module to gather external data from one or more open source databases specific to the organization, the entities of the organization, and the users associated with the organization and its entities, wherein the one or more open source databases include at least one or more of an online professional networking platform for organizations and users, an online website of an organization with pages of their industry groups, teams, and users, and an online public search database.

16. The method of claim 15, wherein the list of specific organization-based classifiers includes a context classifier, a natural language classifier, a historic knowledgebase classifier, an open source classifier, an industry group classifier, a domain classifier, attack vector classifier, and/or a hierarchical relationship classifier, wherein the context classifier is used for text trained on a content for a body of an email for that organization, wherein the natural language classifier is used for text trained on a natural language for that organization, wherein the historic knowledgebase and open source classifiers are used for text trained on any historical information and publicly available information for that organization, wherein the industry group classifier is used for text trained on a particular industry group and its particular industry-based terminology for that organization, wherein the domain classifier is used for text trained on a variety of spoofing domains for that organization, wherein the attack vectors is used for text, objects, and visual representations trained on potential spoofing cyber threats for that organization, and wherein the hierarchical relationship classifier is used for text trained on automatically identifying a high-level/low-level employee structure based on all of the collected employee titles and roles for that organization.

17. The method of claim 16, further comprising:
configuring a cyber threat module in the AI adversary red team simulator and/or the cyber security appliance to reference one or more machine-learning models trained on potential cyber threats in conjunction with the one or more trained AI models as well as the AI classifier, wherein the cyber threat module is configured to cooperate with at least one or more of a payload module, the scenario module, and the simulated attack module to generate the specific attack scenarios executed in the cyber threat defense system based on the trained potential cyber threats identified by the cyber threat module;
configuring a user interface in the AI adversary red team simulator to cooperate with the orchestration module to provide one or more user input parameters specifically tailored to the organization and specified by a particular user in the organization, wherein the orchestration module is configured to reside on at least one of the AI adversary red team simulator and the cyber security appliance; and
wherein the one or more user input parameters include a first parameter configured to identify a predetermined attack to pentest the cyber threat defense system, a second parameter configured to select a predetermined user and entity to be attacked with the identified predetermined attack, a third parameter configured to establish a predetermined threshold to execute the identified predetermined attack on the selected predetermined user and entity, and a fourth parameter configured to restrict one or more predetermined users and entities in the organization from being attacked, wherein the predetermined threshold is configured based on at least one or more of a predetermined time schedule allowed for that attack, a predetermined maximum number of paths allowed for that attack, and a predetermined maximum number of compromised users, devices, and entities allowed for that attack.

18. A non-transitory computer readable medium in an AI adversary red team apparatus, comprising: one or more computer readable codes operable, when executed by one or more processors, to instruct an AI adversary red team simulator configured to reside on the AI adversary red team apparatus to perform the method of claim 10.

\* \* \* \* \*